United States Patent
Surti et al.

(10) Patent No.: US 10,152,764 B2
(45) Date of Patent: Dec. 11, 2018

(54) HARDWARE BASED FREE LISTS FOR MULTI-RATE SHADER

(71) Applicant: Intel Corporation, Santa Clara, CA (US)

(72) Inventors: Prasoonkumar Surti, Folsom, CA (US); Thomas A. Piazza, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 14/666,463

(22) Filed: Mar. 24, 2015

(65) Prior Publication Data

US 2016/0284119 A1    Sep. 29, 2016

(51) Int. Cl.
*G06T 1/60* (2006.01)
*G06T 15/00* (2011.01)
*G06T 15/80* (2011.01)

(52) U.S. Cl.
CPC .............. *G06T 1/60* (2013.01); *G06T 15/005* (2013.01); *G06T 15/80* (2013.01)

(58) Field of Classification Search
CPC . G06T 1/20; G06T 15/80; G06T 11/40; G06T 15/005; G06T 15/04; G06T 2200/28; G06T 1/60
See application file for complete search history.

(56) References Cited

U.S. PATENT DOCUMENTS

| 2008/0143733 | A1  | 6/2008  | Brothers |
|---|---|---|---|
| 2010/0009747 | A1* | 1/2010  | Reville ................... A63F 13/12 463/31 |
| 2013/0141445 | A1* | 6/2013  | Engh-halstvedt ....... G06T 5/002 345/506 |
| 2013/0169642 | A1  | 7/2013  | Frascati et al. |
| 2014/0218390 | A1* | 8/2014  | Rouet .................... G06T 15/405 345/612 |
| 2015/0022519 | A1  | 1/2015  | Lum et al. |
| 2015/0279092 | A1* | 10/2015 | Ganestam ............. G06T 17/005 345/419 |
| 2015/0325037 | A1* | 11/2015 | Lentz ........................ G06T 1/20 345/419 |
| 2016/0042552 | A1* | 2/2016  | McNabb ................. G06T 15/08 345/612 |
| 2016/0078672 | A1* | 3/2016  | Sathe ...................... G06T 15/80 345/426 |

(Continued)

FOREIGN PATENT DOCUMENTS

WO    2006019622 A1    2/2006

OTHER PUBLICATIONS

Yong He, Yan Gu, Kayvon Fatahalian (2014). Extending the Graphics Pipeline with Adaptive, Multi-rate Shading. ACM Trans. Graph., 33(4), 142:1-142:12.*

(Continued)

*Primary Examiner* — Maurice L. McDowell, Jr.

(74) *Attorney, Agent, or Firm* — Trop Pruner & Hu, P.C.

(57) ABSTRACT

A group of buffers are connected via pointers as free-lists implemented in hardware, such that shader information and output processing information can be efficiently accessed by a multi-rate shader. A free-list storage picks the first available entry. The first free entry that gets allocated then becomes a pointer to another entry.

15 Claims, 23 Drawing Sheets

(56) References Cited

U.S. PATENT DOCUMENTS

2016/0239939 A1\* 8/2016 Kakarlapudi ......... G06T 15/005

OTHER PUBLICATIONS

K. Zhang, J. Wang, B. Hua and X. Tang, "Building High-Performance Application Protocol Parsers on Multi-core Architectures," 2011 IEEE 17th International Conference on Parallel and Distributed Systems, Tainan, 2011, pp. 188-195, accessed Sep. 21, 2017.\*
PCT Written Opinion and Search report in corresponding PCT/US2016/019237 dated Jun. 7, 2016 (14 pages).

\* cited by examiner

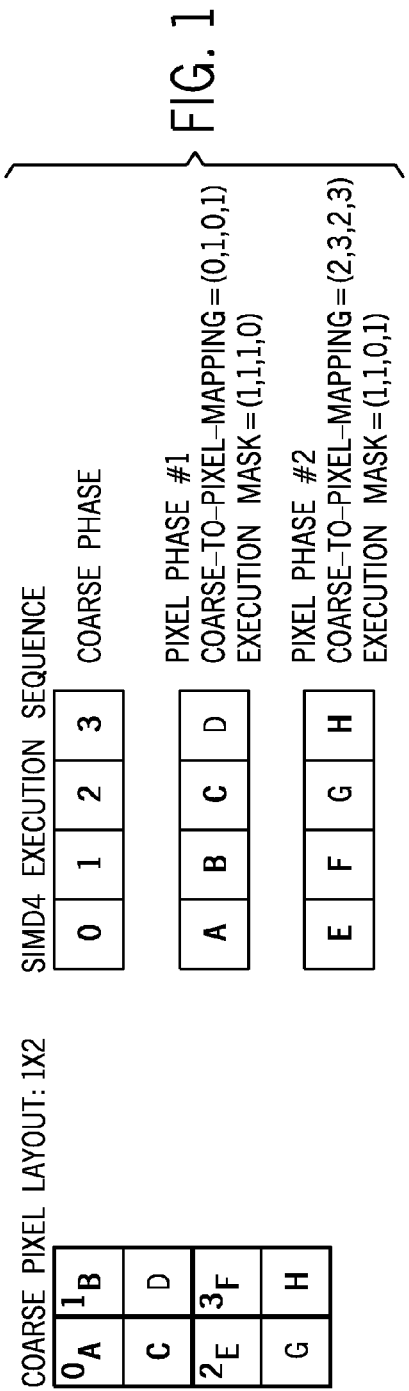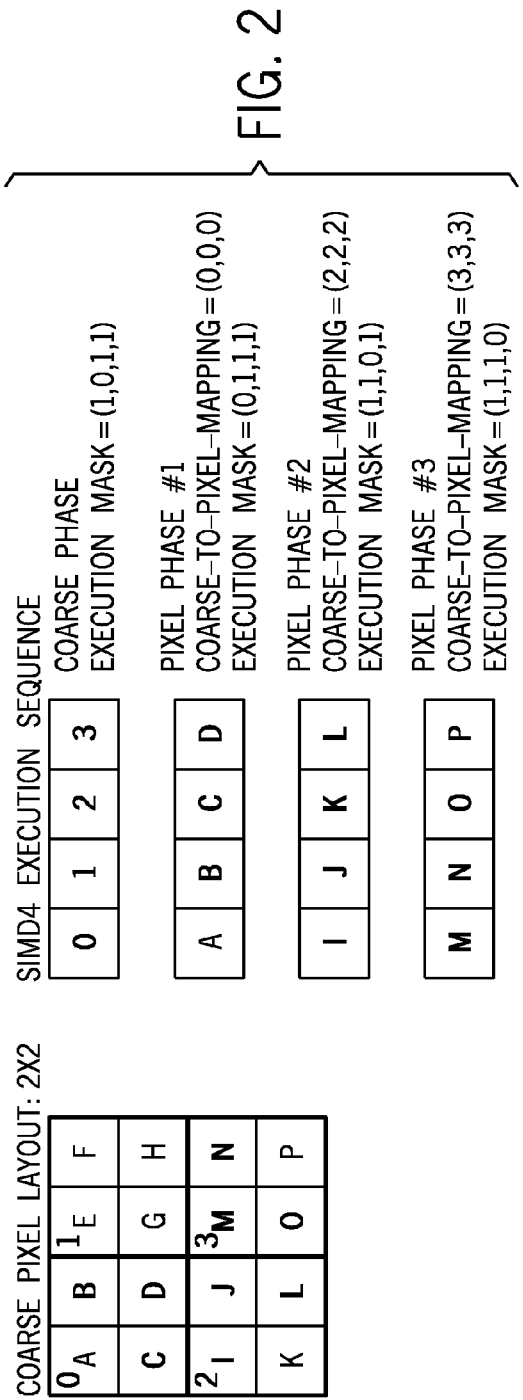

FIG. 8A

| NO MSAA | | | | | |
|---|---|---|---|---|---|
| MASKS | X | Y | AA | CL | TOTAL BITS PER BUF1 ENTRY |
| | | | | | |
| 8 | 13 | 13 | 32 | 10 | 76 |
| | | | | | |
| 4X MSAA | | | | | |
| MASKS | X | Y | CENTROID | CL | TOTAL BITS PER BUF1 ENTRY |
| | | | | | |
| 32 | 13 | 13 | 12 | 10 | 80 |
| | | | | | |
| 8X MSAA | | | | | |
| MASKS | X | Y | CENTROID | CL | TOTAL BITS PER BUF1 ENTRY |
| | | | | | |
| 64 | 13 | 13 | 16 | 20 | 126 |
| | | | | | |
| 16X MSAA | | | | | |
| MASKS | X | Y | CENTROID | CL | TOTAL BITS PER BUF1 ENTRY |
| 128 | 13 | 13 | 20 | 40 | 214 |

TO FIGURE 8B

HARDWARE BASED FREE LISTS FOR MULTI-RATE SHADER

BACKGROUND

A significant portion of the power cost in a 3D pipeline is due to pixel shading. Higher display resolutions and graphics quality, especially in handheld devices, are inconsistent with the need to minimize power dissipation. Running pixel shaders more efficiently would therefore be particularly advantageous.

Coarse pixel shading takes advantage of the fact that geometric occlusion typically introduces higher-frequency details compared to surface shading, and performs shading at a lower rate than visibility testing. Coarse pixel shading is well suited for high pixel density displays, where the effects of reduced shading rates are barely discernible from normal viewing distances. Shading rates may be further reduced in regions of the screen that are blurred or otherwise less perceivable to the user, for instance regions affected by motion or defocus blur, or regions outside the user's foveal vision.

It is difficult to take advantage of these opportunities on current graphics architectures, where shaders execute at per-pixel or per-sample rate. Shading rates may be coarsely controlled by varying frame buffer resolution, but this does not allow more fine grained variation of shading rates, e.g., per object, per triangle, or per image region, which are still coupled to the visibility sampling rate.

Coarse pixel shading (CPS) is an architecture for varying shading rates in a rasterization pipeline, while keeping the visibility sampling rate constant.

Many approaches have been proposed to improve shading efficiency by sampling shading at a lower rate than the visibility sampling rate. Multi-sample anti-aliasing (MSAA) is one such technique, often supported by graphics processor hardware. With MSAA, multiple coverage samples (also called visibility samples) are stored per pixel, but pixel shaders are only executed once for each pixel covered by a primitive. This is in contrast to super-sampling, in which shaders are executed once per covered sample.

Multi-rate shaders are launched at Coarse Pixel (CP) rate and then perform shading at CP, Pixel (P) and Sample (S) rate. Each shading phase involves different inputs at the same rate (e.g. attributes, coverage/execution masks). Since shader execution happens in single instruction multiple data (SIMD) fashion, there is a lot of data that could be shipped with the shader. Since outputs are possible from CP, P and/or S phases of the multi-rate shader, there is information required regarding the states, (x,y)'s etc. required for other data.

BRIEF DESCRIPTION OF THE DRAWINGS

Some embodiments are described with respect to the following figures:

FIG. 1 depicts a coarse quad pixel layout and its 4-wide SIMD execution sequence according to one embodiment;

FIG. 2 depicts another coarse pixel layout and its 4-wide SIMD execution sequence according to one embodiment;

FIGS. 8A and 8B are a BUF1 configuration according to one embodiment;

DETAILED DESCRIPTION

A group of buffers are connected via pointers as free-lists implemented in hardware, such that shader information and output processing information can be efficiently accessed by a multi-rate shader. A free-list storage picks the first available entry. The first free entry that gets allocated then becomes a pointer to another entry.

FIG. 1 illustrates an example of multi-rate shader execution for a coarse pixel quad layout of 1×2 pixels mapped to one SIMD program for different layouts of coarse pixels. A coarse pixel is a group of pixels that share the result of a single coarse pixel shader evaluation. FIG. 2 illustrates an example of multi-rate shader execution for a 2×2 coarse pixel quad layout. The diagrams show one 4-wide SIMD quad for simplicity, but this solution applies to any number quads mapped to wider SIMD machines. The numbers (0, 1, 2, 3) represent coarse pixels, while the capital letters (A, B, C, . . . ) represent pixels. The left side of each diagram illustrates a 2-dimensional view of pixels after rasterization, where numbers/letters in lighter text denote unlit pixels. The right side shows execution order of phases in a monolithic program on an SIMD machine.

In the first phase ("coarse phase"), all four SIMD lanes execute coarse-rate instructions for a coarse pixel quad. In the next phase (pixel phase #1), the same SIMD lanes are used to execute subsequent groups of pixel quads covered by the coarse quad. The set of pixel shader quads and their mapping to coarse pixels is dependent on both coarse pixel layout (e.g. 1×1, 1×2, 2×1, 2×2, 2×4, 4×2, 4×4) and rasterization mask (some quads may be completely unlit). Furthermore, the SIMD execution mask may be different for each group.

In phase one, with the first three pixels lit and the fourth pixel unlit, the execution mask is (1, 1, 1, 0), so that the unlit pixel is not executed. The coarse-to-pixel mapping for phase #1 is (0, 1, 0, 1) or coarse pixel 0 maps to pixel A, coarse pixel 1 maps to pixel B, pixel C also maps to coarse pixel 0 and pixel D maps to coarse pixel 1. For phase #2 the coarse-to-pixel mapping is 2, 3, 2, 3. All these pieces of information are unknown at shader compilation, which would contribute to significant software overhead, if coarse-to-pixel transition were implemented in software using an existing set of assembly instructions.

Figure 3:
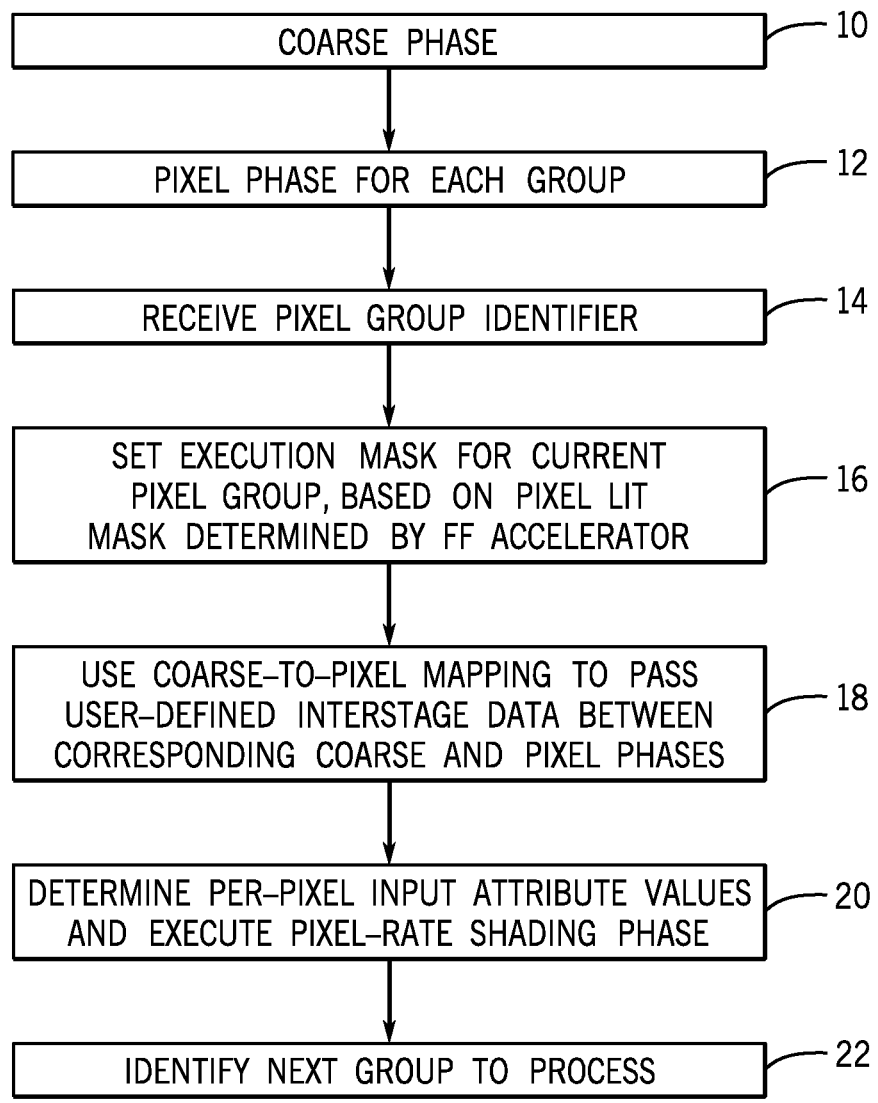
FIG. 3 is a flow chart for a kernel to handle both coarse and pixel rate shading according to one embodiment.

The sequence shown in FIG. 3 may be implemented in software, firmware and/or hardware. In software and firmware embodiments it may be implemented by computer executed instructions stored in one or more non-transitory computer readable media such as magnetic, optical or semiconductor storage.

The sequence of FIG. 3, as indicated in block 10, a coarse phase is implemented for all groups or quads. This is followed in block 12 by the implementation of a pixel phase for each group using the coarse-to-pixel mapping and the execution mask so that the same SIMD lanes can be used to execute both coarse and pixel quads covered by the coarse quads.

Then the sequence receives a pixel group identifier (pixel group_id) (block 14) to identify a particular group of pixels such as a quad. The execution mask is set for the current pixel group (block 16) based on the pixel lit mask. Then the coarse-to-pixel mapping is used to pass user-defined interstage data between corresponding coarse and pixel phases as indicated in block 18. The per-pixel input attribute values are determined and the pixel-rate shading phase is executed for each group at block 20. In block 22 the next group to process is identified.

To allow shading at a rate lower than once per pixel, the notion of a coarse pixel (CP) is introduced. A CP is a group of $N_x \times N_y$ pixels, which will share the result of a single coarse pixel shader (CPS) evaluation. This is similar to how multiple visibility samples share a single pixel shader evaluation with MSAA, with the difference that the shading rate may be varied by varying the size of the CP. Groups of 2×2 CPs, called coarse quads (CQs), are shaded at a time to facilitate computing derivatives using finite differences.

Many applications can benefit from the ability to vary shading rates across different regions of the screen. To enable such variation in the shading rate, the screen may be divided into tiles of size $T_x \times T_y$ while allowing a different value of the CP size for each tile. Each tile maps to a shading grid of CQs, with the selected CP size.

A simplified decoupled sampling technique may be achieved by avoiding overlapping shading grids, which ensures that each pixel unambiguously belongs to only one CQ. This can be achieved by restricting the CP sizes to a finite set of values that ensure that the shading grid is perfectly aligned with the tile boundaries. With this assumption, the shading technique can be summarized as follows:

---
Algorithm 1 Simplified decoupled sampling with CPS.
---
for each primitive:
    for each covered tile on screen:
        Rasterize tile and store visible fragments
        Determine Nx , Ny for tile
        Divide tile into CQs of size 2Nx × 2Ny
        for each CQ with visible fragments:
            Shade CQ
            Write output color to all covered pixels

---

In order to ensure a perfectly aligned grid of CQs inside a tile, the CP sizes may be restricted such that the tile size is a common multiple (e.g., the least common multiple (LCM)) of all allowed CQ sizes.

A small number of modes that are easy to use, may control the CP size, yet those modes are powerful enough to support a range of applications. In each case, the user does not directly specify a CP size, but rather a pair of CP parameters $(s_x, s_y)$ that specifies the desired CP size. The CP parameters are then quantized to the closest available CP size that meets or exceeds the requested shading rate. Based on the selected mode, the CP parameters $(s_x, s_y)$ may be:

interpolated from per-vertex shader outputs,
    set to a constant value using render state, or
    expressed as a radial function of screen coordinates.

Controlling the CP parameters with a shader output is highly flexible, and allows many use cases to be expressed.

Constant CP parameters may be enabled for simplicity. It is the least invasive method for adding CPS to an existing application. The ability to use a radial function is included specifically for foveated rendering. As a radial function cannot be robustly expressed using linear interpolation of per-vertex attributes, a separate mode may be used for this special case.

In order to always meet the required shading rate, the CP size, $N_x \times N_y$, is determined by computing conservative lower bounds for $|s_x|$ and $|s_y|$ within the tile, and rounding down to the nearest available CP size. The use of absolute values here enables use of negative CP parameters for motion and defocus blur.

There are two sources of quantization of CP sizes. First, the CP size is evaluated only once per tile. Second, the CP size is quantized to one of the finite available CP sizes. Both of these sources cause discontinuities in the CP sizes moving from tile to tile, which may result in visible tile transitions. To compensate for these discontinuities, the texture sampler level of detail (LOD) calculation is augmented to reflect the requested (un-quantized) CP size. This can be done by scaling the finite differences of texture coordinates that are used to compute the texture LOD:

$$\delta_x^{new} = \delta_x \frac{|s_x|}{N_x}, \delta_y^{new} = \delta_y \frac{|s_y|}{N_y},$$

where $\delta_x$ and $\delta_y$ are the finite differences of the texture coordinates along the x- and y-axes respectively. The values of $\delta_x$ and $\delta_y$ are evaluated for every CP, unlike the CP size which is evaluated once per tile. Compensating the texture LOD creates a smooth variation in image detail, which masks the discontinuities in the CP size.

Although LOD compensation can be effective in many cases, there are some scenarios where it might not be applicable, for example, with procedurally generated textures. In such cases, LOD compensation techniques can possibly be applied in user space, based on the CP size and CP parameters, which are available as shader inputs.

Shading may be executed at three different rates within the same rendering pass. Some of the shader computations can be moved to a lower rate than once per pixel, while certain high-frequency effects can be evaluated per pixel, or even per visibility sample to reduce aliasing. This is not possible in current graphics application program interfaces (APIs), as the pixel shader can be configured to run at pixel or sample rate, but the two are mutually exclusive. Conceptually, the single pixel shader stage of the graphics pipeline is divided into three distinct phases, one for each rate (see FIG. 2). Hence, after a tile is divided into coarse quads, each quad is shaded at one or more different rates: per-CP, per-pixel, and per-sample.

Figure 4:
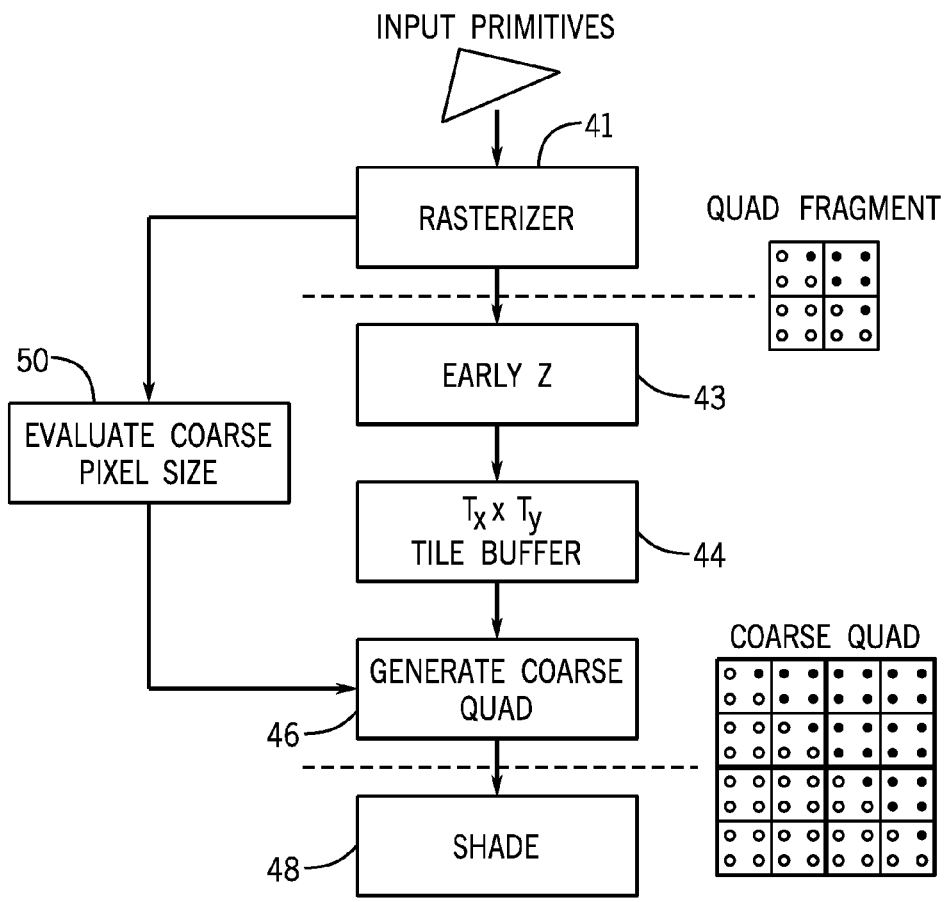
FIG. 4 is a pipeline abstraction of post-rasterization stages.

FIG. 4 illustrates how CPS can be integrated into an existing graphics pipeline. The rasterizer 41 tests input primitives to generate quad fragments, which are subjected to an early depth test (block 43) and then buffered in tile buffer 44, for every tile on the screen. The buffered fragments are mapped to coarse pixels and coarse quads in block 46, based on coarse pixel size (block 50), which are then shaded in block 48 and mapped into the output buffers. With a simplified decoupled sampling technique, rasterized samples for a given tile and primitive may be buffered in a tile buffer 44, and then the pixel shader 48 is invoked on complete CQs. The tile buffer retains the screen coordinates and all the necessary information to resolve visibility, such as depth values and coverage information. When a new tile or a new primitive is rasterized, the tile buffer is flushed, i.e., only a single tile's worth of data needs to be buffered.

Figure 5:
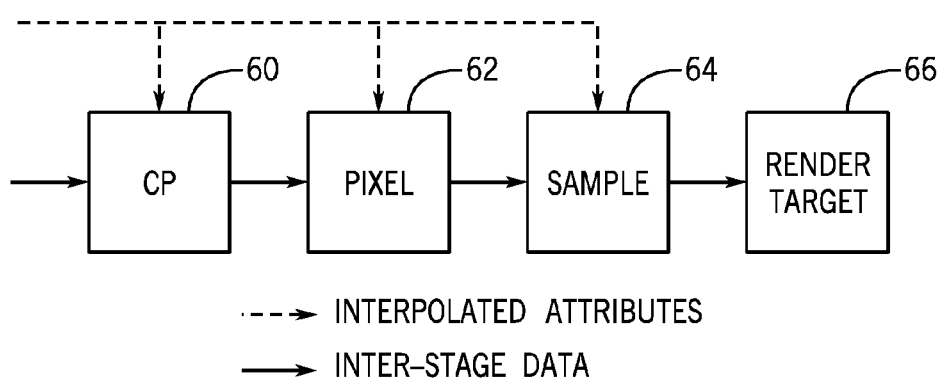
FIG. 5 depicts a portion of graphics pipeline for coarse pixel shading.

FIG. 5 illustrates how CPS and multi-rate shading are integrated into the pipeline abstraction of an existing graphics architecture like Direct3D 11 to produce render targets 66. Each shading phase has access to interpolated per-vertex interpolated attributes (IA) and a small amount of data may be communicated from one phase to the next through user-defined shader outputs; the amount of data allowed is an implementation-specific limit. Any of the phases (CP 60, pixel 62, sample 64) may also write outputs that will be consumed in later pipeline stages (e.g., framebuffer blending).

In multi-rate shading a low frequency diffuse term is computed per coarse pixel and a high frequency specular term is computed per pixel. The CP size is controlled through the vertex shader. In one embodiment a single conceptual pipeline stage may run a single shader compiled from up to three different entry points, one for each rate as shown below:

```
struct VS_OUT { // Output attributes
    float2 cpcize: SV_CoarsePixelSize;
};
VS_OUT VertexShader (VS_IN In){
    VS_OUT Out;
    Out.cpsize = ComputeCPSIZE (In);
    ...
    return Out;
}
[shadingphase ("coarse-pixel")]
[nextshaderfunc ("PixelShader")]
float 4 CoarseShader (VS_OUT In) {
    return ComputeDiffuse (In);
}
[shadingphase ("pixel")]
float 4 PixelShader (VS_OUT VSIn, float 4 CPIn) {
    return ComputeSpecular (VSIn, CPIn);
```

This approach provides programmers with a high degree of visibility into, and control over, what code runs at each rate, as well as what data flows between phases. The simpler models described above may still be implemented as layered abstractions in cases where control can be sacrificed for ease of use.

When CP size is being controlled by shader code, an additional system-interpreted value, SV_CoarsePixelSize, is made available to the last shading stage before the rasterizer. This output is a two-component vector, and corresponds to the CP parameters ($\delta_x$, $\delta_y$). Typically this output will be set in a vertex shader, but could also be defined in a hull, domain, or geometry shader, if these are used.

In addition, shader code running at CP rate has access to inputs for both the interpolated values of the CP parameters before quantization, and the actual coarse pixel size: SV_RequestedCoarsePixelSize and SV_CoarsePixelSize, respectively. These two values together are sufficient for a shader to compute its own LOD compensation, for use in computations that do not involve the texture sampler (e.g., prefiltering a procedural texture).

There are several important use cases, where CPS can be used to significantly reduce the amount of pixel shading work. This is by no means an exhaustive list, as there are many more use cases.

Rendering to the native resolution of high-DPI displays is often a task too demanding for the graphics processing unit (GPU). The typical remedy is to lower the rendered resolution and upsample the image, which results in perceivable quality degradation along object silhouettes, while changes in surface interiors are not as apparent. Instead, by using CPS and setting the CP parameters to a constant value, such as 2×2 pixels, we can achieve a dramatic reduction of shading rate while retaining most detail.

With more flexible control over the shading rate, a wider range of applications may be enabled, as discussed below.

Some materials have lots of surface detail, while others do not. By choosing a CP parameter depending on the material type, computations can be saved where the visual impact is minimal. For instance, a particle system for rendering smoke may be rather homogeneous and shaded at a low rate, while a sign with text may warrant high resolution shading. Similarly, objects in full shadow may possibly be shaded at a lower rate than objects in bright sunlight.

CPS makes it easier to shade efficiently with foveated rendering, avoiding resending geometry over multiple rendering passes. A configurable radial function controls the shading rate with a few parameters: the point that corresponds to the center of the gaze, c, aspect ratio, a, inner and outer minor radii, $r^i$ and $r^o$, and inner and outer CP parameters, $s^{min}$ and $s^{max}$. For foveated rendering, $r^i$ may be set to a size representing a view angle of about 5°, and a=1 for a circular falloff function.

Although the shading system supports arbitrary positions for the high resolution region in some embodiments, merely fixing c at the center of the screen and using a wider aspect also produces good results, most notably when rendering from a first person perspective. This technique may be called peripheral CPS rendering, in contrast to proper foveated rendering, which is only possible with gaze tracking.

Regions of the screen with motion or defocus blur typically have a narrow frequency response and can be shaded at a lower rate. With CPS, one can control the shading rate in such regions by setting CP parameters in the vertex shader that are proportional to the screen space velocity or circle of confusion at that vertex. Since the vertex shader is evaluated before clipping, there may be vertices behind the camera or at zero depth. For such cases, shading rate is not reduced to ensure robustness.

The CP parameters can be determined separately for the x- and y-axes in order to generate anisotropic shading rates for motion blur. By assigning negative CP parameters for vertices in front of the focal plane and positive CP parameters for those behind, the CP parameters will interpolate to zero at the focal plane. Similarly, assigning signed CP parameters for velocity ensures zero values at stationary points inside a moving primitive. Since the screen space circle of confusion radius and velocity are linear functions in screen space, perspective-correct interpolation should be disabled for the CP parameter in such cases.

There are several different applications where multi-rate shading provides a valuable tool for scaling quality versus performance. High quality ambient occlusion term is computed every 2×2 pixels using voxel cone tracing while diffuse texture lookups are evaluated at a pixel rate to retain most of the surface detail. Similarly, complex low-frequency lighting computations, such as indirect lighting, can also be evaluated at a lower rate.

Another example is locally increasing the shading rate in difficult regions. This may be done to compute shading at a pixel or sample rate only around specular features, and lower elsewhere. It is fairly common for today's real-time workloads to implement a type of multi-rate shading using a two-pass approach. In this case, the first pass runs at pixel rate (MSAA), but discards difficult pixels which are marked in a stencil buffer. The second pass then runs shading per sample, but only for pixels marked in the stencil buffer. Using CPS, such algorithms can be converted to a single pass, which selectively computes the result in the pixel- and sample-rate shaders, executing results at even lower rates, where possible.

CPS multi-rate shading can also be used to perform culling on a per CP (e.g., 4×4 pixels) basis.

One CPS software implementation is a pipeline in a central processor based functional Direct3D 11 simulator. For this implementation, a tile size of 16×16 pixels and CP size widths and heights of 1, 2, or 4 may be used. In order to support the CPS programmer abstractions the DirectX High Level Shading Language is extended and new API functions may be introduced. The simulator may be instrumented to measure the dynamic instruction count, in order to give an indication of the cost of shading. All memory accesses to the color buffer may be tracked for measuring color bandwidth.

In addition to pixel shading, a coarse pixel (CP) as well as a sample rate shading phase may be introduced in the pipeline. There are several potential implementation strategies for multi-rate shading depending on how these additional phases are scheduled across multiple processors and threads. In a scheduling strategy, the CP, pixel, and sample rate shading phases are executed consecutively on the same thread. Restricting the schedule in this manner enables a simple implementation, which requires significantly fewer changes to the pipeline. It eliminates the need to transport data across phases since the data can reside in the same registers. It also avoids complex flow control mechanisms for throttling inter-phase data.

Figure 6:
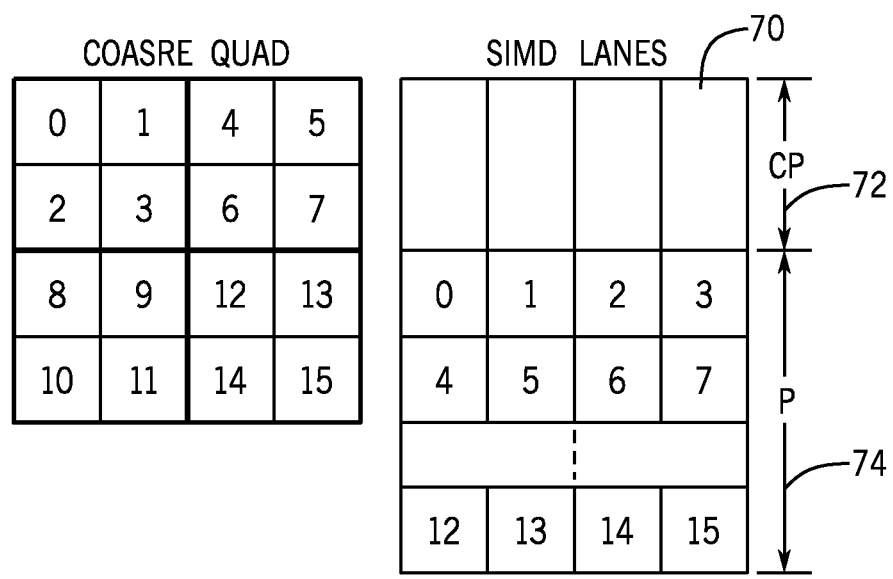
FIG. 6 depicts multi-rate shading with a coarse pixel quad scheduled in a single thread on a 4-wide SIMD processor.

FIG. 6 shows a coarse quad with a CP size of 2×2 scheduled on a 4-wide SIMD processor having lanes 70. First, the four CPs in the coarse quad (e.g. 0123, 4567, . . . 12131415) are executed concurrently at 72 across the SIMD lanes which facilitates computing of finite differences. Following the coarse phase, the processor concurrently schedules 2×2 pixel quads at 74 inside the coarse quad, looping over all covered quads. Since this scheduling scheme requires movement of data across SIMD lanes when transitioning across phases, we assume the availability of processor instructions to facilitate this in an efficient manner.

For SIMD widths greater than 4 (say 8 or 12), multiple coarse quads may be scheduled concurrently. However, since each coarse quad can have a different number of covered pixels, a higher SIMD width can also lead to a reduced utilization of some SIMD lanes as some pixel phase loops terminate early. For improved efficiency with large SIMD widths, one may choose a more optimal scheduling scheme that distributes the pixel phase work more evenly across SIMD lanes or even separate threads.

Shading at a lower rate than once per pixel has implications for how well color buffer compression works to reduce the memory bandwidth. A higher degree of uniformity in color values within 2×2 or larger pixel blocks generally reduces the entropy and makes compression more efficient.

Coarse pixel shading (CPS) can significantly reduce the cost of shading with little to no perceivable impact on image quality. CPS fits naturally in the evolution of the real-time graphics pipeline as it introduces a new degree of flexibility through programmable shading rates, while still addressing a real need for energy efficiency for the fast growing market of hand-held devices.

A fundamental problem in supporting multi-rate shading is dealing with bookkeeping information so that a shader can access its inputs at P and/or S phase in an efficient manner while retaining this information to pass on to the rest of the pipeline. The solution may have three components in some embodiments:

1. partitioning the storage as free-lists such that the first available entry is picked while invoking the pixel shader and made free (available) when that pixel shader completes execution;
2. providing hierarchical indirection (i.e. going from one pointer to another) for PS pull model and PS render target outputs from multiple phases; and
3. restructuring storage for non-CPS cases to pay for CPS related storage.

Figure 7:
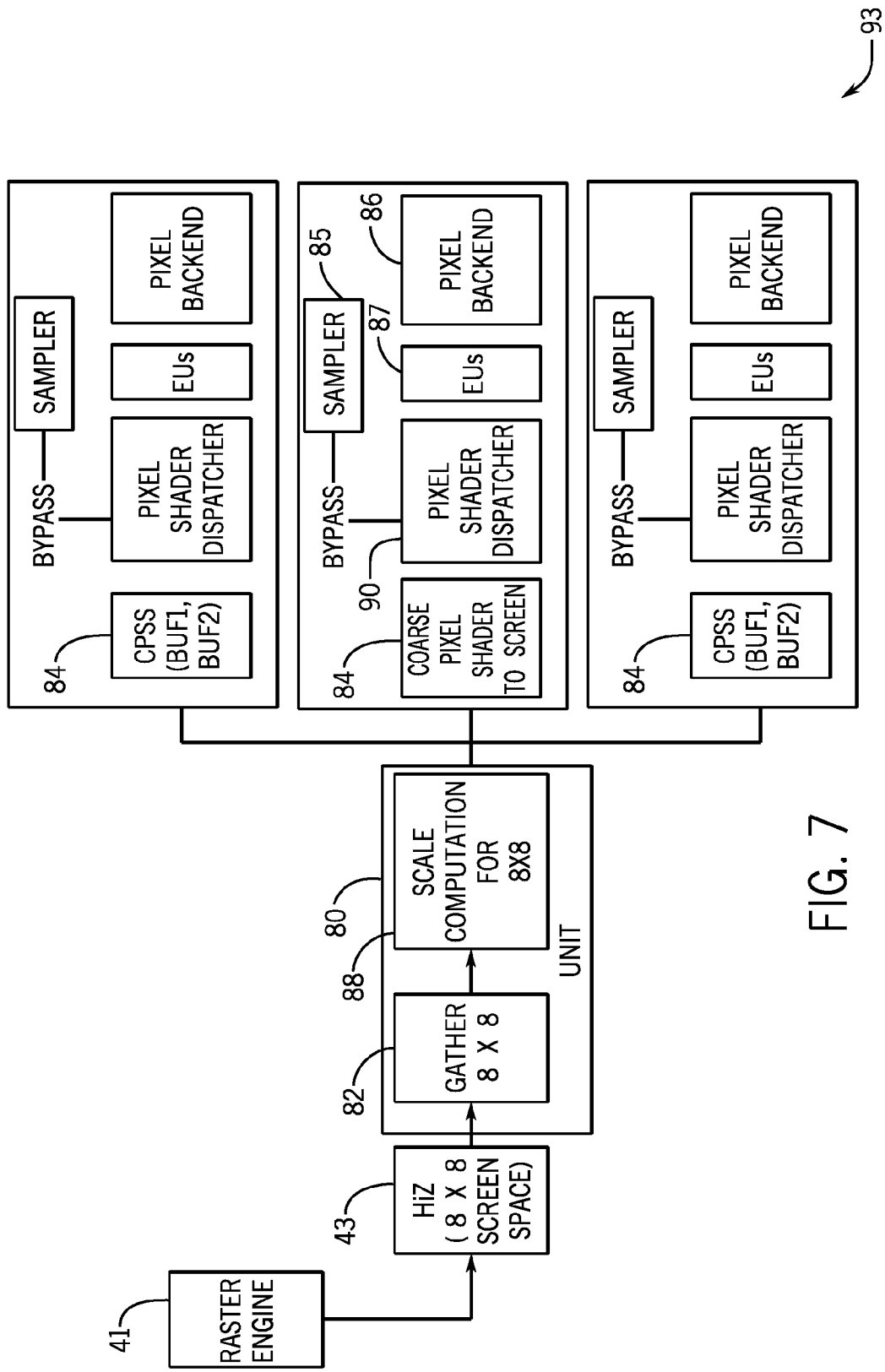
FIG. 7 is a schematic depiction of one embodiment.

As shown in FIG. 7, pixel data from a raster engine 41 is depth buffered and culled in HiZ unit 43 before reaching the unit 80 coupled to pixel processing unit 93. While three replicated units are shown, these units may be replicated many times.

The unit 80 gathers (block 82) blocks of 2×2 pixels into 8×8 blocks for all samples that survived the early depth test, assembles data-structure BUF1 84 and stores 2 bits of masks per sample i.e. 128 bits of masks. The status bits indicate: 00 means unlit in the raster, 01 means stencil fail, 10 means depth (Z) fail and 11 means both pass or no Z/stencil test and covered in the rasterization. Then coverage masks and depth/stencil test results can be encoded from the early depth/stencil tests.

Figure 8B:
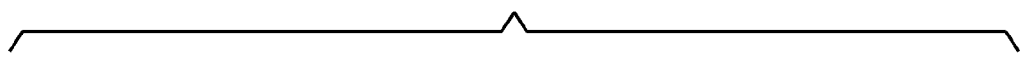

BUF1 also has, per 2×2 pixel quad, pixel coordinates (X, Y) of unlit (UL) pixels, srcZ (depth source operand; see FIG. 19), Z cache line (CL) addresses and centroids, as shown in FIGS. 8A and 8B. BUF1 can be configured as shown in FIGS. 8A and 8B. Cache line storage is used in one embodiment because of the allocation technique. If one wants to access a cache line after a pixel is retired, one needs to have information about which cache line to go after.

BUF1 is configured statically as shown in FIGS. 8A and 8B based on semi-pipeline bits related to NUM_MULTI-SAMPLES or NUM_FORCED_SAMPLECOUNT. NUM_MULTISAMPLES specifies a number of samples per pixel when MSAA is enabled (e.g. 4×MSAA will have NUM_MULTISAMPLES equal to 4). FORCED_SAMPLE-COUNT is a Microsoft application program interface for target independent rasterization that forces a number of samples in the raster engine.

There are 6×6×16×4=2304 physical sub-spans present in a sub-slice in one embodiment. In order to cover stages in the sub-slice, 2.5K sub-spans are used in BUF1. An array of valid bits is maintained using flops outside embedded random access memory (EBB).

Allocation is hierarchical priority encode in a pipelined fashion across all entries in a free-list to find an invalid location. For an initial allocation, the valid bit is set, and then reset when pixel shader (PS), launched at CP rate, emits final color to that sub-span. Dereferencing is performed by shader-to-screen conversion unit 86. After allocation, a 13b pointer per screen pixel 2×2 quad may be pipelined to the next stage.

BUF1 (PQBUF) can be represented as the following data-structure:

```
Typedef struct{
    X_UL[12:0],
    Y_UL[12:0],
    Masks[3:0][15:0][1:0],//2X2 pix, 16samples/p, 2bits/sample
    Z_CL[3:0][1:0][4:0],
    AA_value[3:0][7:0],
    Centroid[3:0][4:0]
} PQBUF[num_pq_entries]
```

Next a free-list in BUF2 (CPQBUF), also at 84 in FIG. 7, implements a data structure for 2×2 CPs as shown below:

| Actu-alCPSize X | Actu-alCPSize X | PQ_Valid [15:0] | PQ_Ptr [15:0] [11:0] | Cen-troid | Total Bits |
|---|---|---|---|---|---|
| 2 | 2 | 16 | 192 | 32 | 244 |

BUF2 has an entry for each CP 2×2 pixel quad. It stores quantized scale-factors, used by scale computation/centroid function 88 (FIG. 7) determined based on the nature of shading (CP, P or S) and type of MSAA and pointers to up to 16 pixel quads and centroids for CPs. Since a sub-slice can have up to 6×6×4=144 CP quads present, 192 entries may be used for BUF2 in one embodiment. Each entry is allocated by execution units (EUs) 87 on receiving a CP quad from the centroid function 88 by priority encoding the valid bits. A valid bit is set on an allocation and a pointer for that entry is sent down to pixel shader dispatcher 90 in shader space with computed centroids and other information pipelined from upstream. The valid bit is reset on CP completely processed from pixel backend 86 when all the fragments for a given SIMD CP message have retired (for CP-only case) or when a thread with those handles retires out of backend 86 for the (CP+P+S) case.

BUF2 (CPQBUF) can be represented as the following data-structure:

```
Typedef struct{
    ActualCPSizeX[1:0],
    ActualCPSizeY[1:0],
    PQPTR_valid[15:0],
    PQPTR[15:0][11:0],//each CPQ can have upto 16 2X2 pixels
    Centroid[3:0][7:0]
} CPQBUF[num_cpq_entries]
```

This buffer holds pointers to the CPQBUF entries. Since each entry in this buffer for PS invocation, there is a virtual PS invocation ID known as FFTID (Fixed Function Thread ID) used as address to this buffer. An entry is assigned based on a free-list in this buffer i.e. first available entry is picked while invoking a PS and made free (available) when that PS completes execution. Each PS invocation can be for SIMD8/16 or 32 PS threads and therefore it has 2, 4 or 8 CPQs (Coarse Pixel Quads).

The pixel shader dispatcher (BYPASS BUF) 90 (FIG. 7) explains how different buffers are referenced and how information duplication is avoided in multi-rate shading. The BYPASS BUF is connected to sampler 85.

Pixel shader dispatcher 90 can be represented as the following data-structure:

```
Typedef struct{
    CPQPTR_valid [3:0],
    CPQPTR [3:0][11:0],//each CPQ can have up to 16 2X2 pixels
    Poly_data_per_thread[159:0] // C0, Cx, Cy for attributes
} BYPASSBUF[num_FFTIDs]
```

Figure 9:
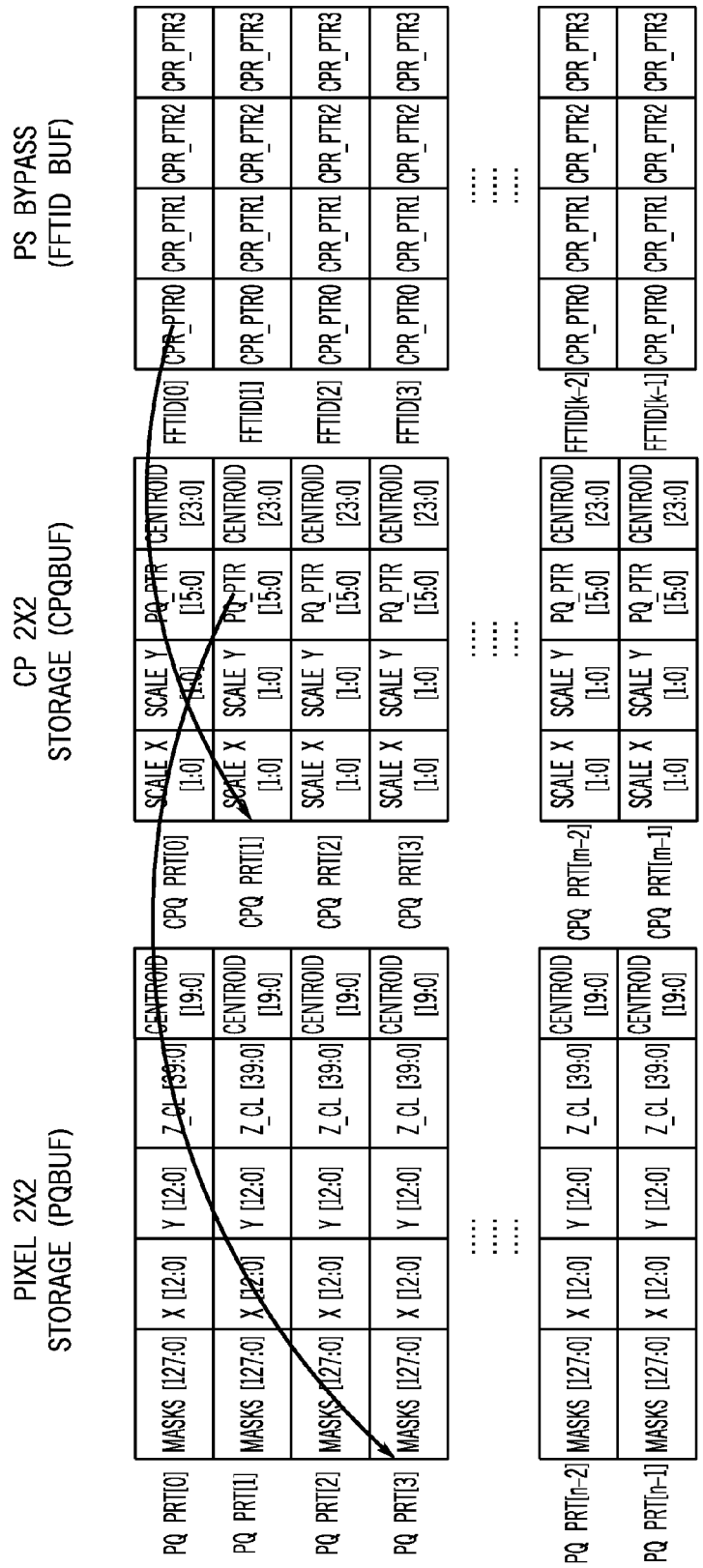
FIG. 9 is a bypass BUF configuration according to one embodiment.

FIG. 9 shows, on the left, a 2×2 pixel storage in a CPQBUF or BUF1, a coarse pixel (CP) 2×2 storage in CPQBUF or BUF2 in the center and a pixel shader bypass or FFTID BUF on the right. The BUF1 shown on the left has coordinates x and y, the masks, the centroid and the cache line storage. The buffer in the middle includes the scale factors and the PQ pointer. The PQ pointer points to a particular storage within the BUF1 as indicated by the arrow going from CPQBUF to PQBUF. Also the CPQBUF includes the centroids. Then the pixel shader bypass on the right includes a pointer to a particular entry in the CPQBUF as shown by the arrow extending from the pixel shader bypass to the CPQBUF.

With CPS and multi-rate shading, all this information for pixels needs to be present in BYPASS BUF. Since CPS packs a lot more pixels, there are many pixels in flight in the pixel shader stage. This organization of the data-structure replaces a flat BYPASS BUF, with hierarchical free-lists in hardware. This allows BYPASS BUF to store either PQ or CPQ pointers P1 and P2 so that pixel rate or coarse pixel rate dispatch can use in both BUF1, and BUF2 or just in BUF1, depending on shading type.

A sequence during pull messages or render target write messages: (pull messages have FFTID so getting to CP or P related information is by chasing pointers to the structures (free-lists):
PolylData=FFTID.PolyData
Coarse Pixel Data=FFTID.CPQPTR.*
Pixel Data=FFTID.CPQPTR.PQPTR.*

In essence, hardware performs dependent lookups on 3 storages. First the hardware looks up the PS BYPASS free-list, then it determines the CPQ pointers P1 and for each CPQ pointer, it looks up CPQBUF, it gets addresses P2 to PQBUF and performs the final read of PQBUF to get pixel data. The use of pointers avoids duplicating information in more than one buffer.

These free-list based data-structures in hardware can be used in future to launch subsequent multi-stage kernels.

Instead of having a monolithic PS, CP, P and S stages shaders can be independent invocations. Using hardware for the free-list based data structures enables more efficient rate changing because when a rate changes an output, a coarse pixel could map to 2×2, 4×4 or 4×2 types of screen pixels. The information in the buffers tells how to process these pixels because of the need to find out what are the other physical attributes of these pixels in order to process them down the pipe, and all that information is in the data structure.

Figure 10:
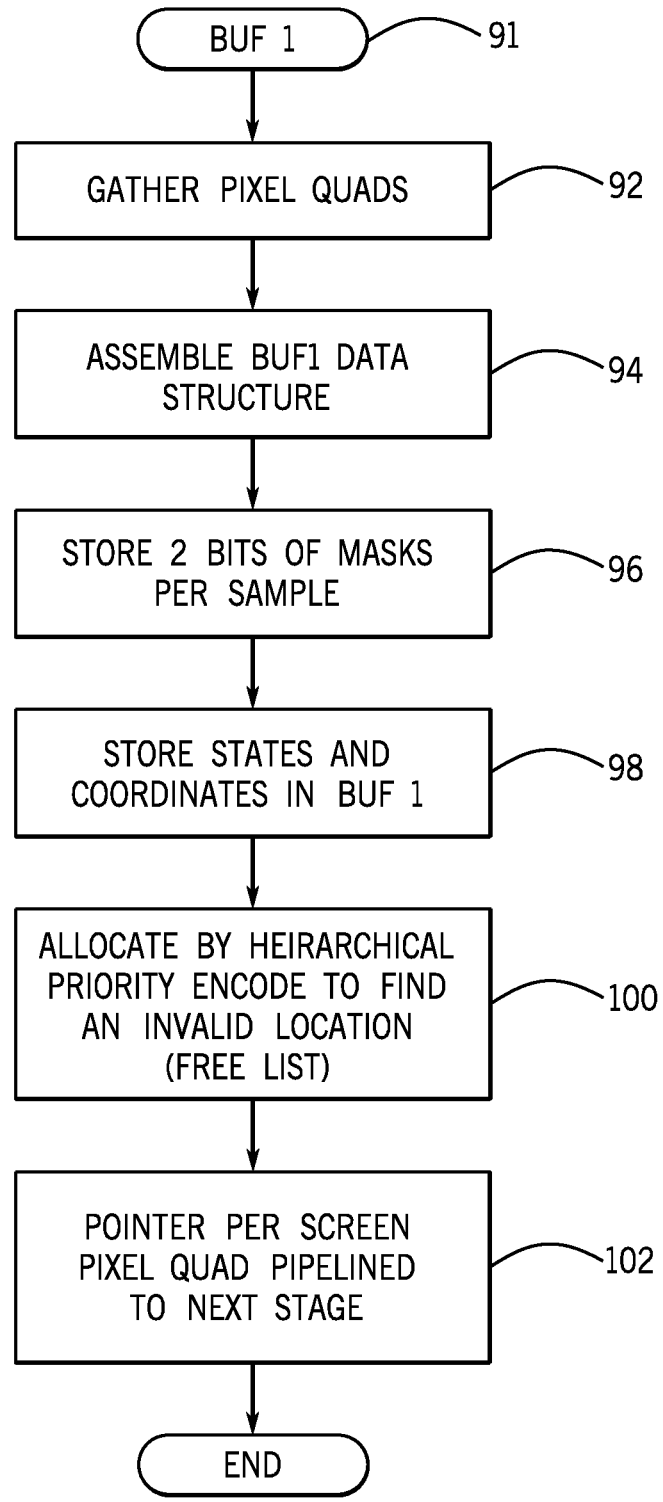
FIG. 10 is a flow chart for BUF1 according to one embodiment.

Referring to FIG. 10, a BUF1 sequence 91 may be implemented in software, firmware and/or hardware. Hardware may be particularly advantageous in some embodiments. In software and firmware embodiments, a sequence may be implemented by computer readable instructions stored in one or more non-transitory computer readable media such as magnetic, optical or semiconductor storage.

The sequence 91 begins by gathering the pixel quads as indicated in block 92. Then the BUF1 data structures are assembled as indicated in block 94.

Next two bits of masks of stored per sample as indicated in block 96. This provides the information to encode coverage masks and depth/stencil test results from the early depth/stencil tests.

Then the states and coordinates are stored in the BUF1 as indicated in block 98. Next allocation is done by hierarchical priority encode to find any invalid locations using a free-list technique as indicated in block 100. Finally a pointer per screen pixel quad is pipelined to the next stage as indicated in block 102.

Figure 11:
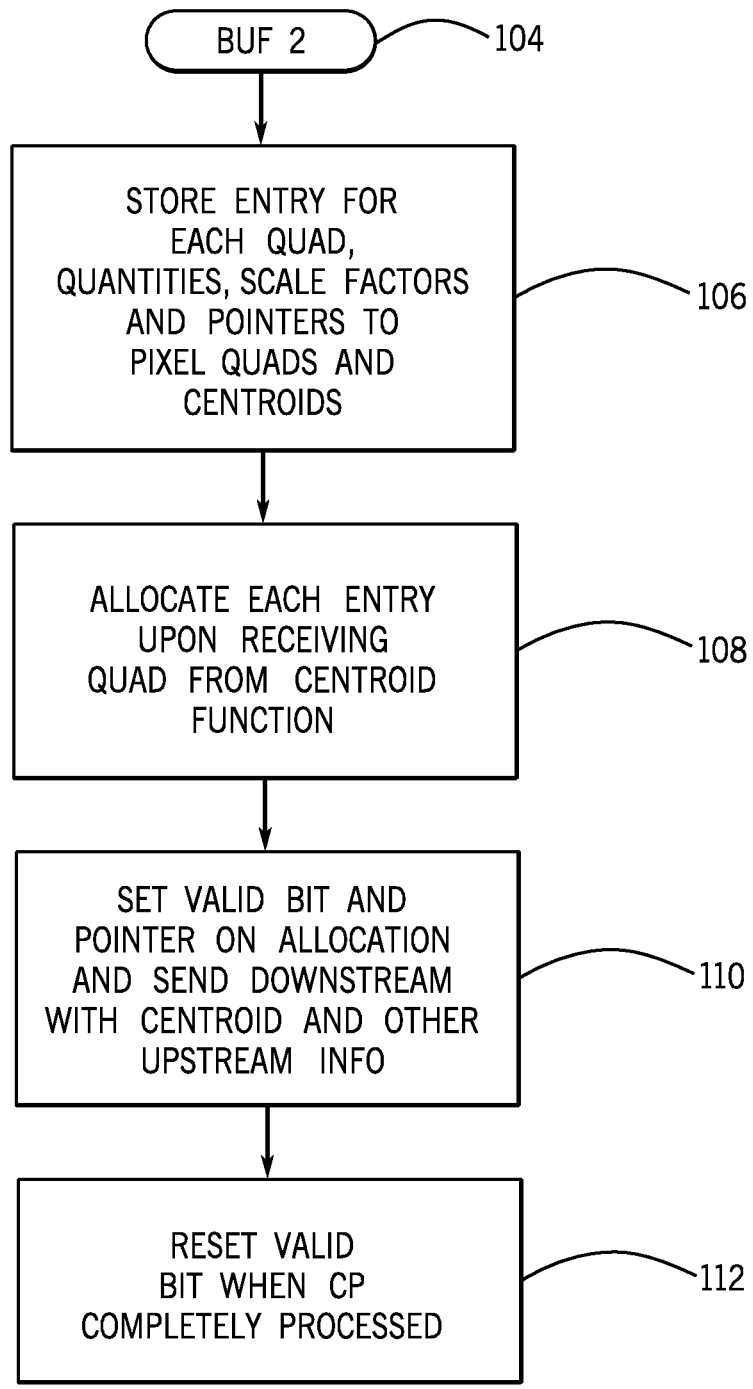
FIG. 11 is a flow chart for BUF2 according to one embodiment.

The BUF2 sequence 104, shown in FIG. 11 may be implemented in software, firmware and/or hardware. Hardware embodiments may be advantageous. In software and firmware embodiments, computer executed instructions may be stored in one or more non-transitory computer readable media such as magnetic, optical or semiconductor storage.

The sequence 104 begins by storing an entry for each quad including quantized scale factors and pointers to pixel quads and centroids as indicated in block 106. Each entry is allocated upon receiving a quad from the centroid function as indicated in block 108.

A valid bit and pointer are set on allocation and a valid bit is sent downstream with the centroid and other upstream information as indicated in block 110. Finally, the valid bit is reset when the CP completely processes as indicated in block 112.

Figure 12:
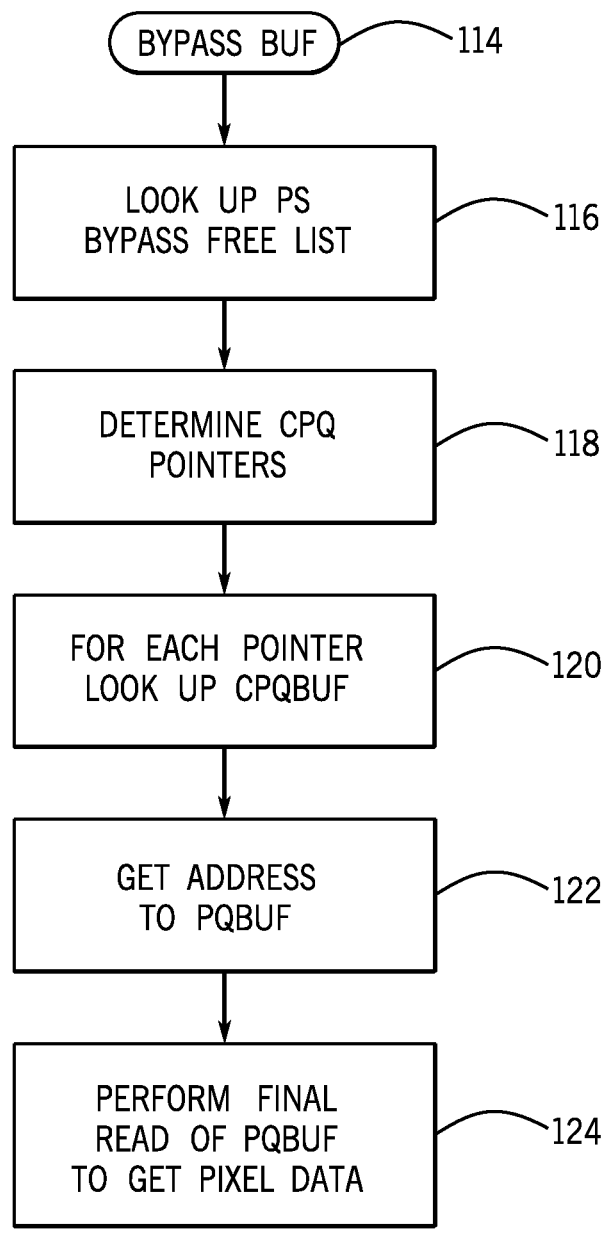
FIG. 12 is a flow chart for bypass BUF according to one embodiment.

Moving to FIG. 12, the bypass BUF sequence 114 may be implemented in software, firmware and/or hardware. Hardware embodiments may be advantageous. In software and firmware embodiments, the sequence may be implemented by computer executed instructions stored in one or more non-transitory computer readable media such as magnetic, optical or semiconductor storage.

The sequence 114 begins by looking up the PS bypass free-list as indicated in block 116. Then the CPQ pointers are determined as indicated in block 118.

For each pointer the sequence looks up the CPQBUF as indicated at block 120. Then the addresses to the PQBUF are obtained as indicated in block 122. Finally the final read of the PQ buffer is implemented to get the pixel data as indicated in block 124.

Figure 13:
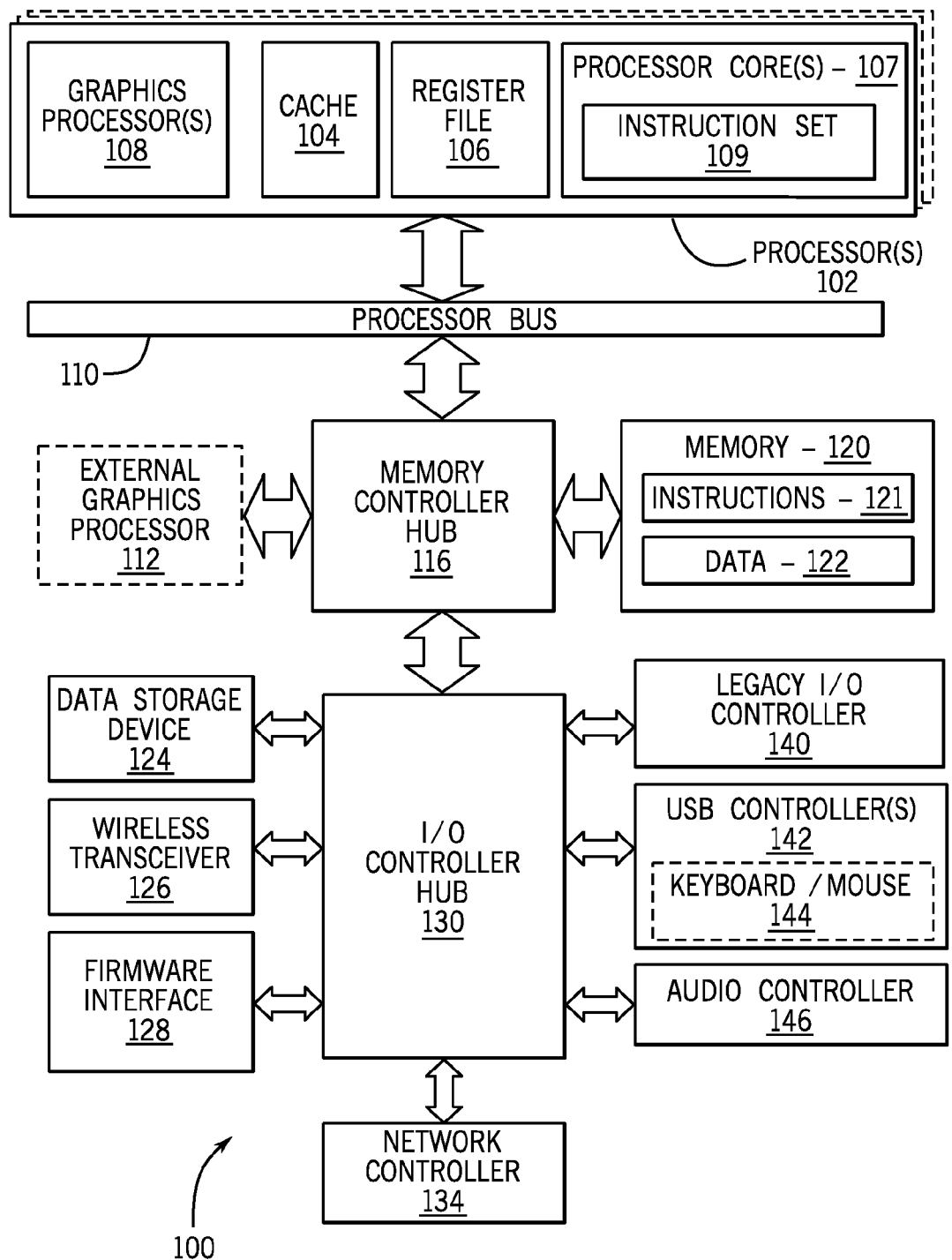
FIG. 13 is a block diagram of a processing system according to one embodiment.

FIG. 13 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 14:
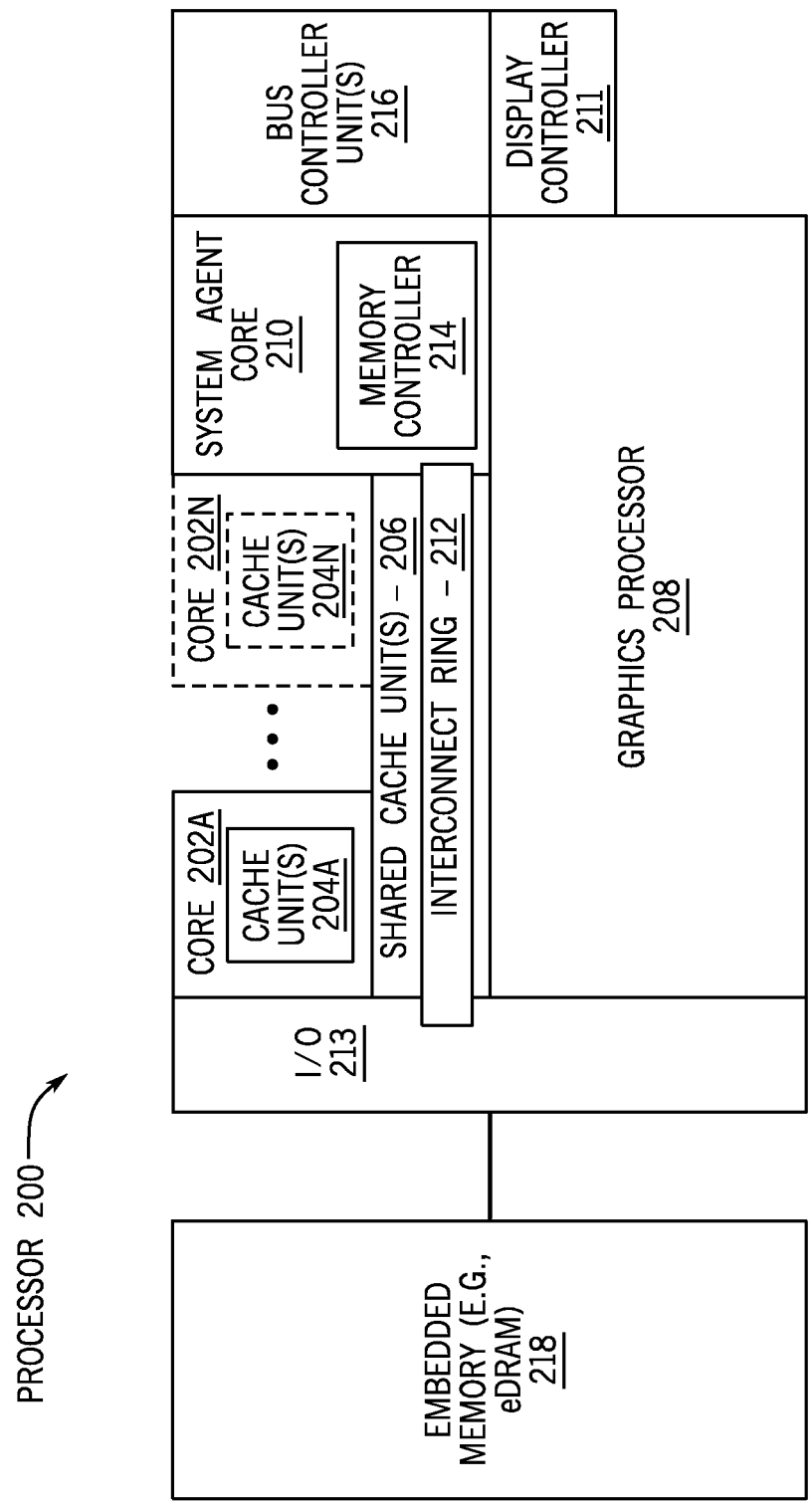
FIG. 14 is a block diagram of a processor according to one embodiment.

FIG. 14 is a block diagram of an embodiment of a processor 200 having one or more processor cores 202A-202N, an integrated memory controller 214, and an integrated graphics processor 208. Those elements of FIG. 14 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 15:
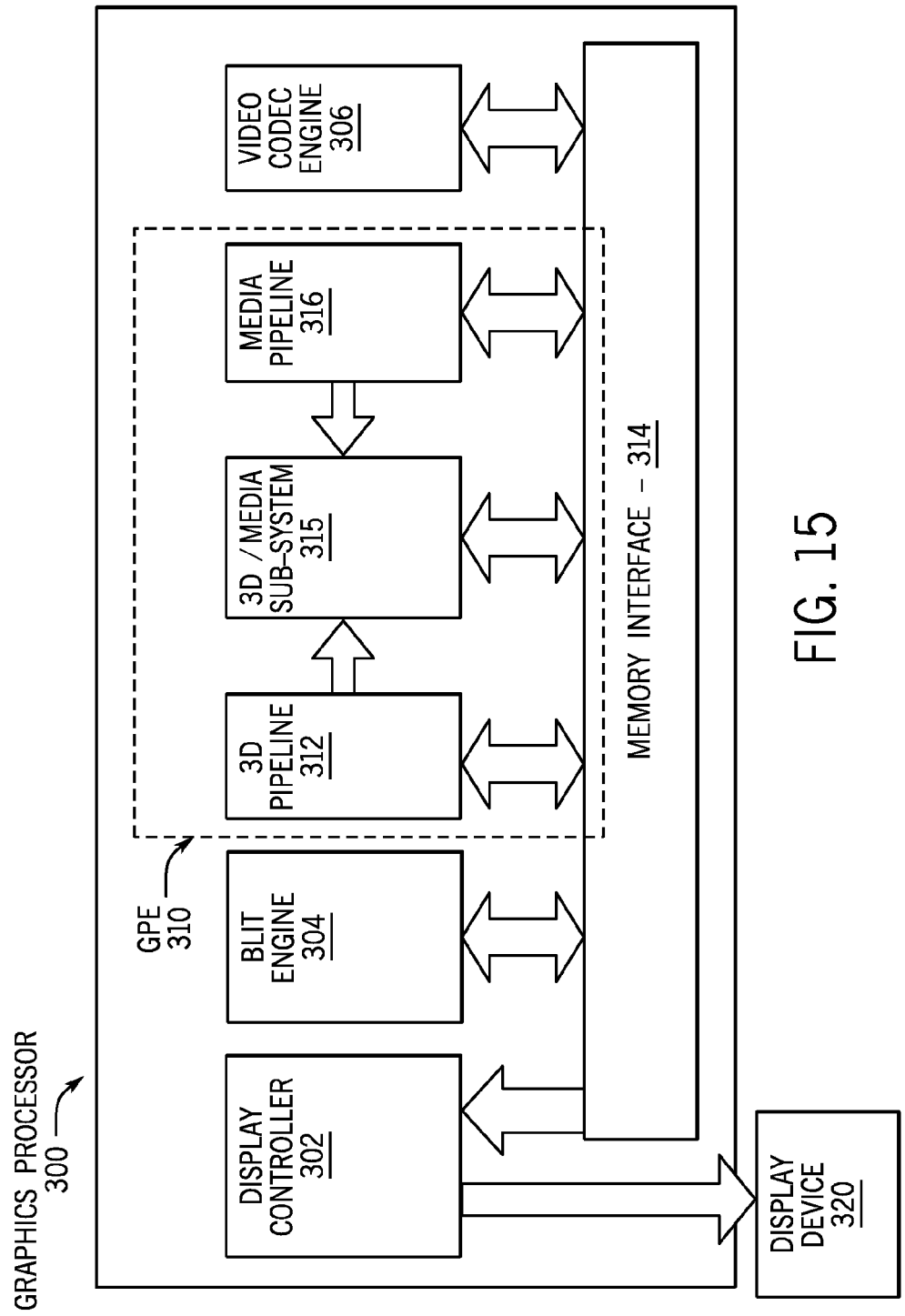
FIG. 15 is a block diagram of a graphics processor according to one embodiment.

FIG. 15 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/

MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Figure 16:
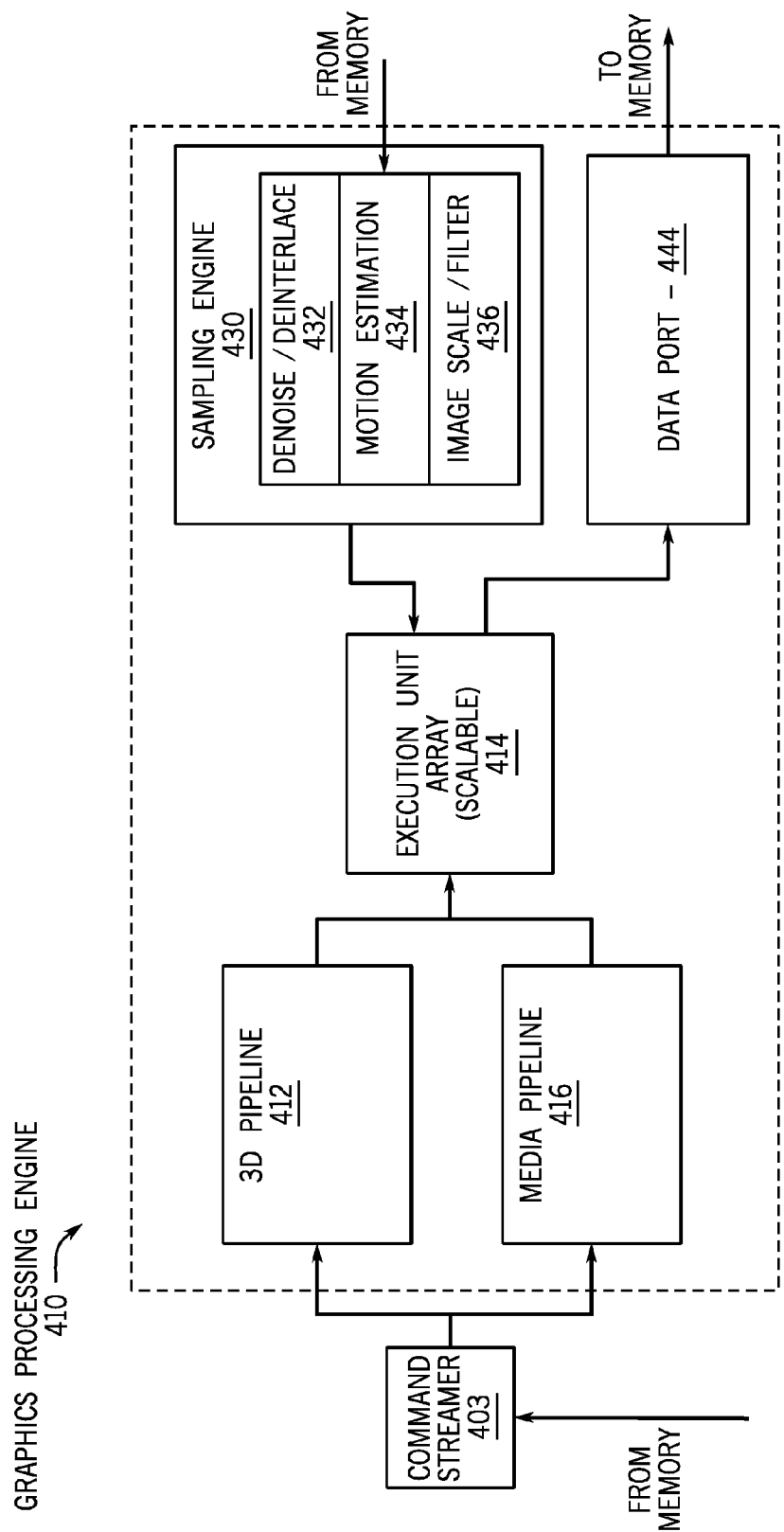
FIG. 16 is a block diagram of a graphics processing engine according to one embodiment.

FIG. 16 is a block diagram of a graphics processing engine 410 of a graphics processor in accordance with some embodiments. In one embodiment, the GPE 410 is a version of the GPE 310 shown in FIG. 15. Elements of FIG. 16 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Figure 17:
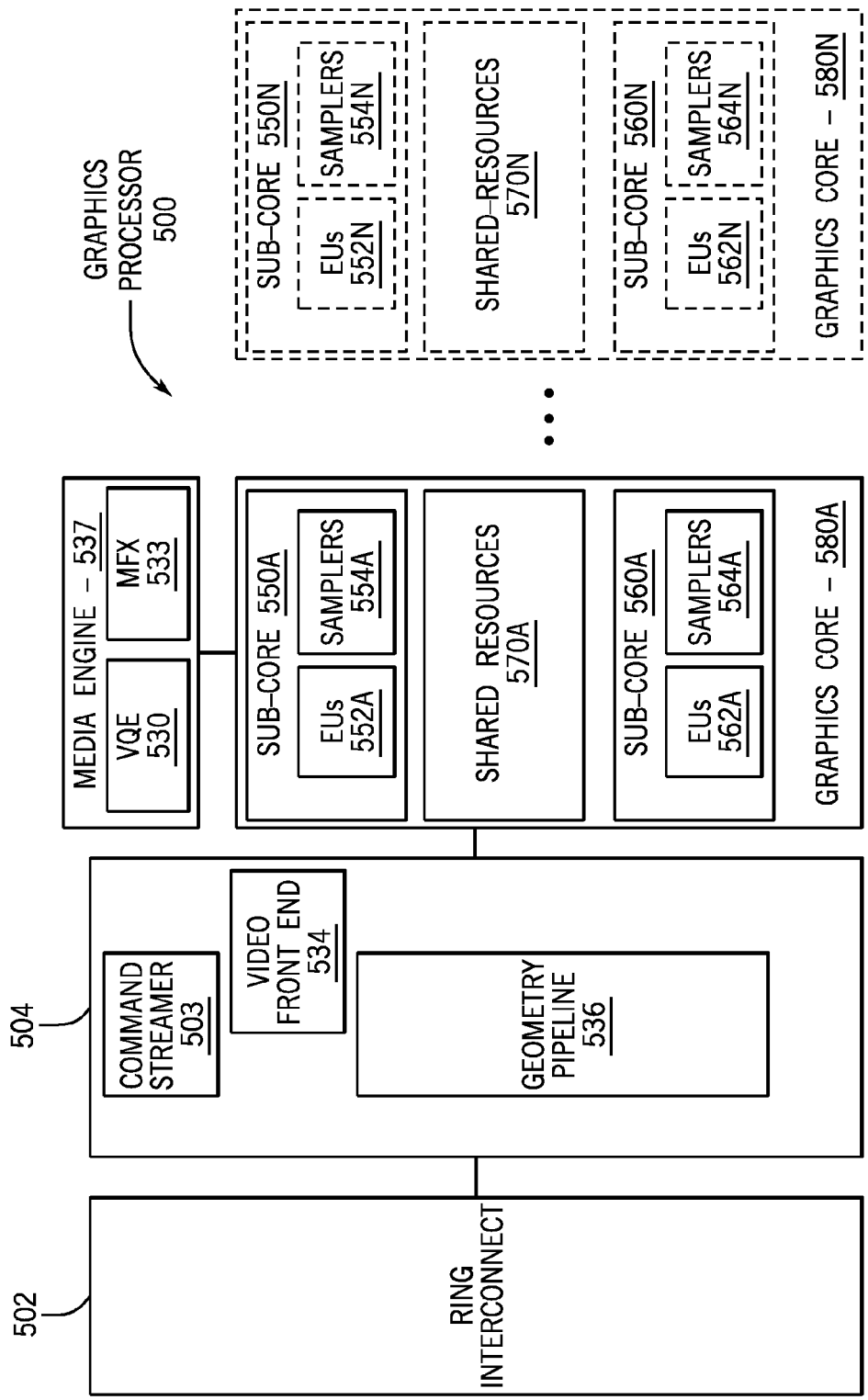
FIG. 17 is a block diagram of another embodiment of a graphics processor.

FIG. 17 is a block diagram of another embodiment of a graphics processor 500. Elements of FIG. 17 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 18:
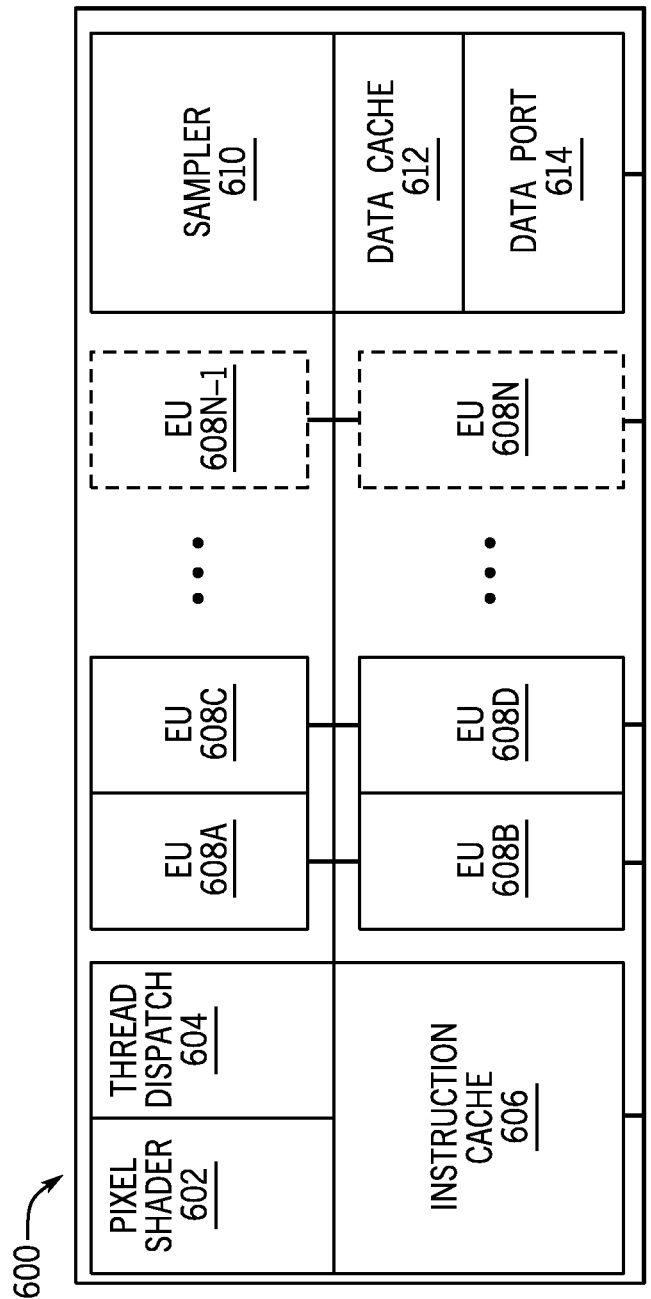
FIG. 18 is a depiction thread execution logic according to one embodiment.

FIG. 18 illustrates thread execution logic 600 including an array of processing elements employed in some embodiments of a GPE. Elements of FIG. 18 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 17) dispatches vertex processing, tessellation, or geometry processing threads to thread execution logic 600 (FIG. 18). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 19:
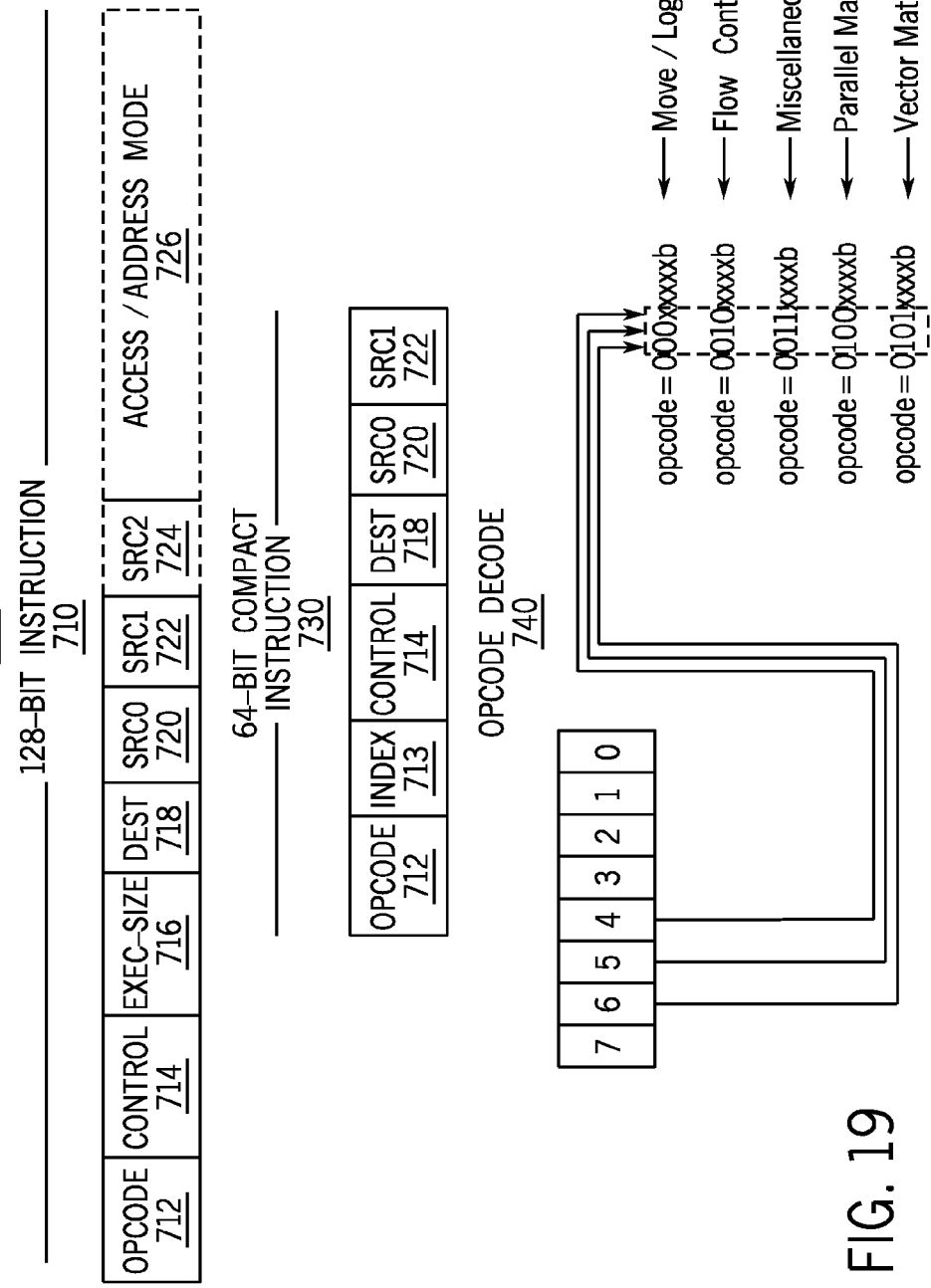
FIG. 19 is a block diagram of a graphics processor instruction format according to some embodiments.

FIG. 19 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 20:
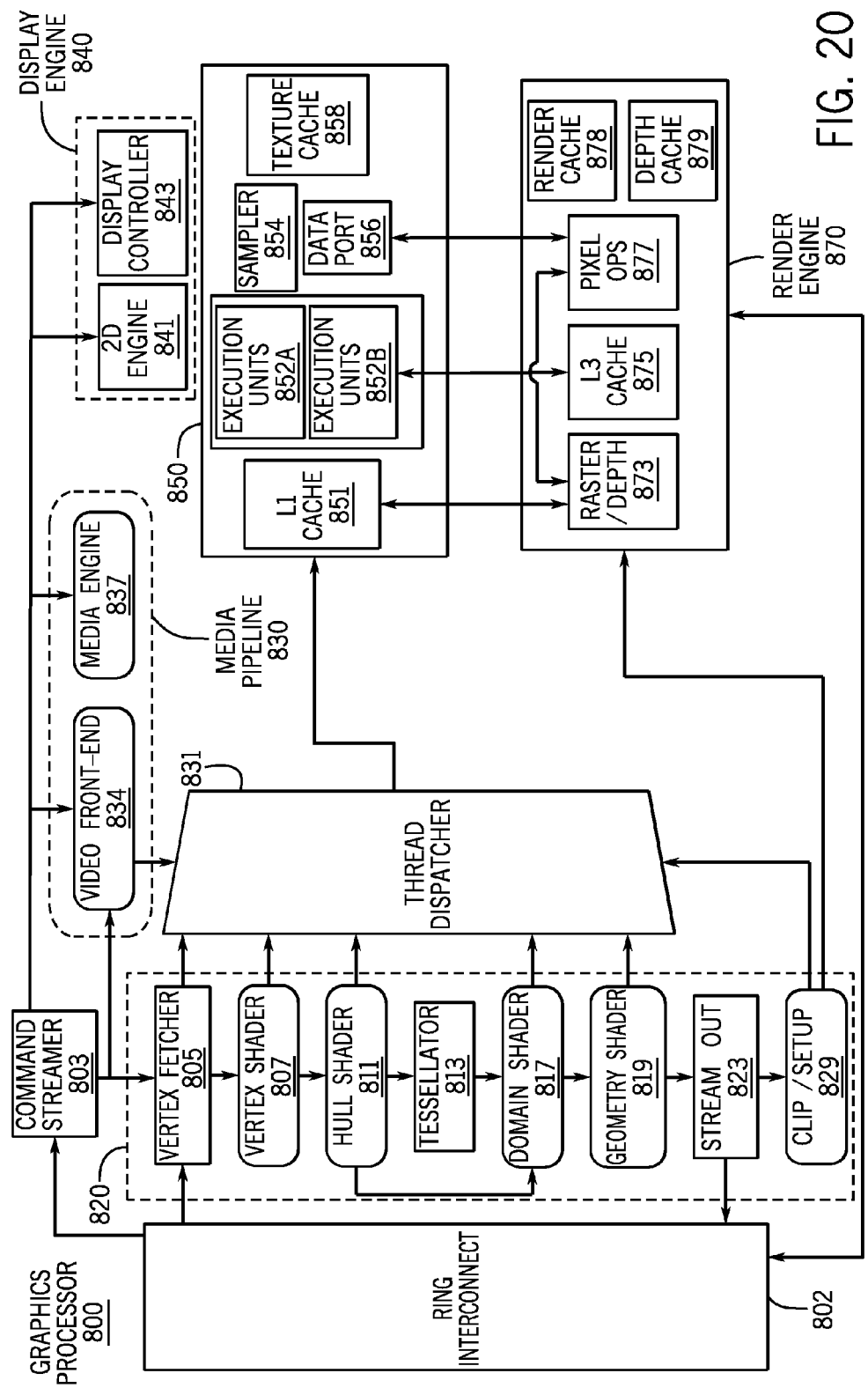
FIG. 20 is a block diagram of another embodiment of a graphics processor.

FIG. 20 is a block diagram of another embodiment of a graphics processor 800. Elements of FIG. 20 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer/depth 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 21A:
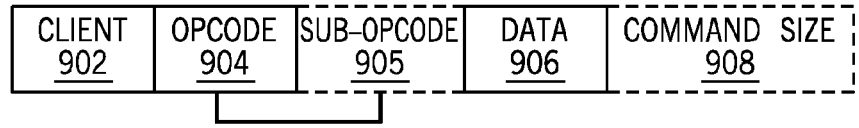
FIG. 21A is a block diagram of a graphics processor command format according to some embodiments.
Figure 21B:
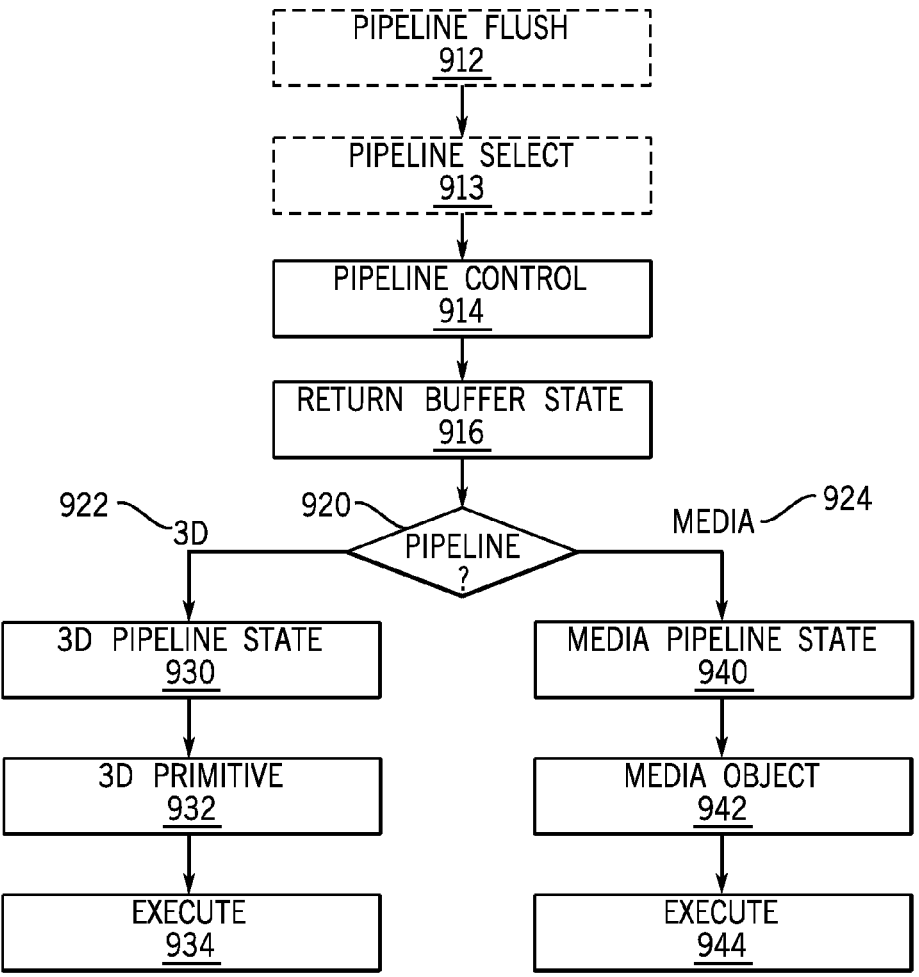
FIG. 21B is a block diagram illustrating a graphics processor command sequence according to some embodiments.

FIG. 21A is a block diagram illustrating a graphics processor command format 900 according to some embodiments. FIG. 21B is a block diagram illustrating a graphics processor command sequence 910 according to an embodiment. The solid lined boxes in FIG. 21A illustrate the components that are generally included in a graphics command while the dashed lines include components that are optional or that are only included in a sub-set of the graphics commands. The exemplary graphics processor command format 900 of FIG. 21A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 21B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Figure 22:
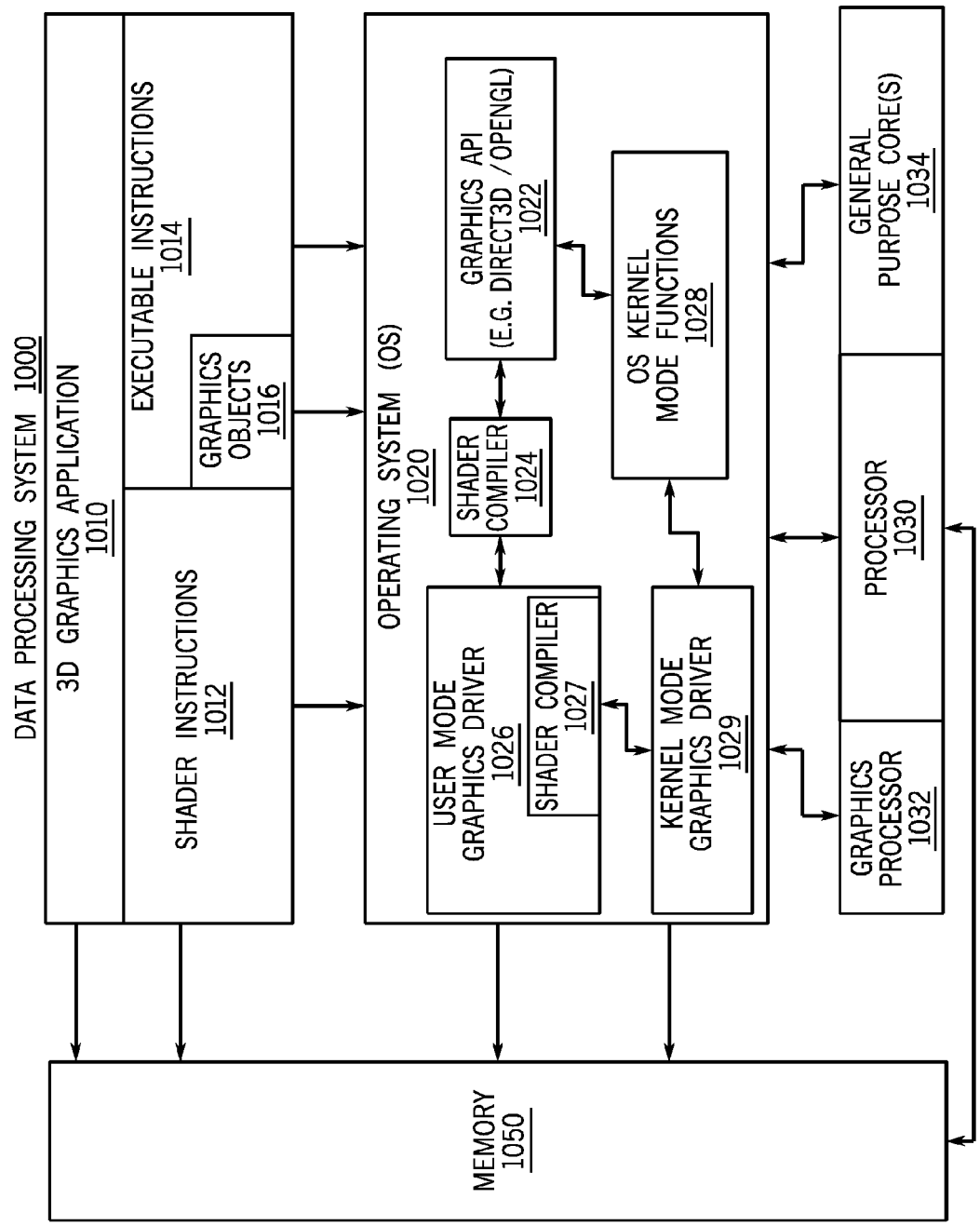
FIG. 22 is a depiction of an exemplary graphics software architecture according to some embodiments.

FIG. 22 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 23:
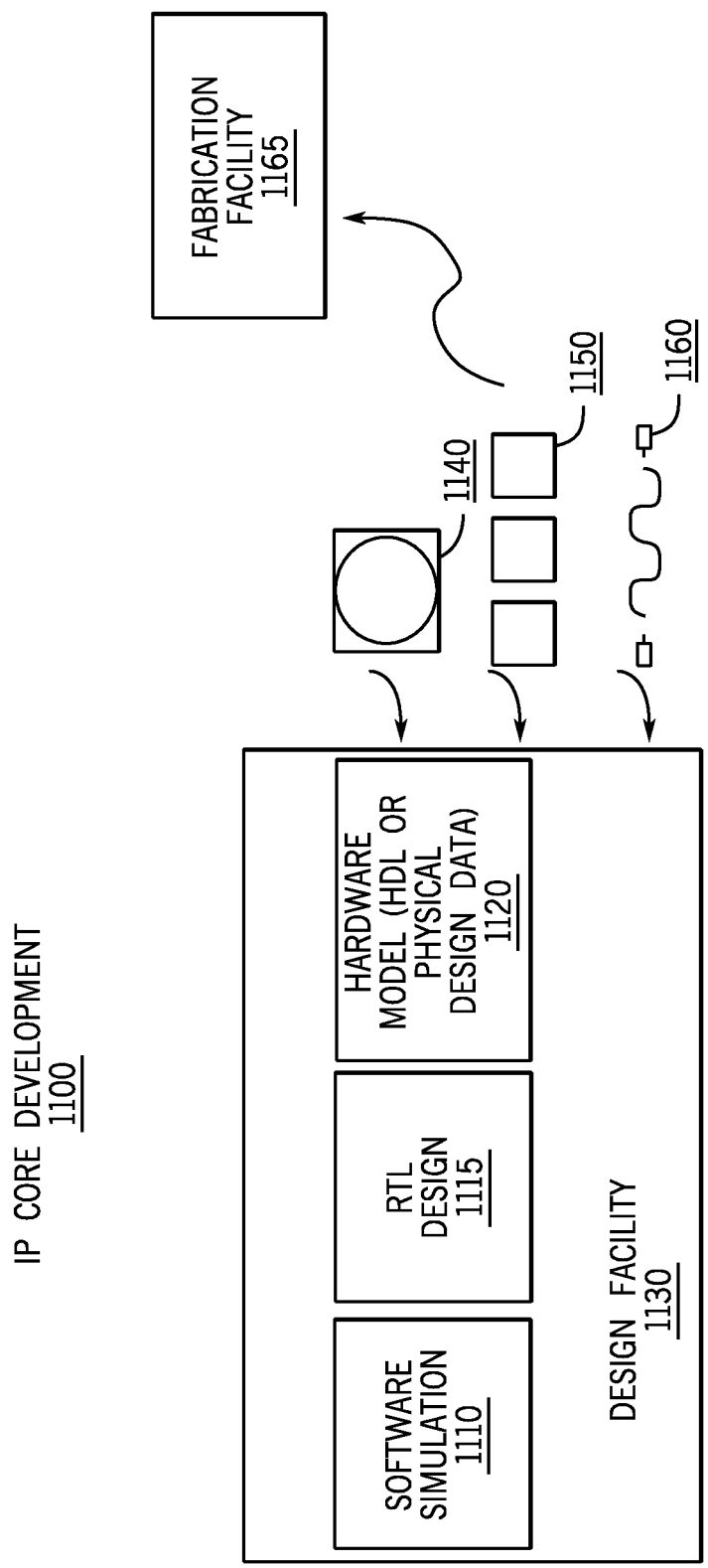
FIG. 23 is a block diagram illustrating an IP core development system according to some embodiments.

FIG. 23 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 24:
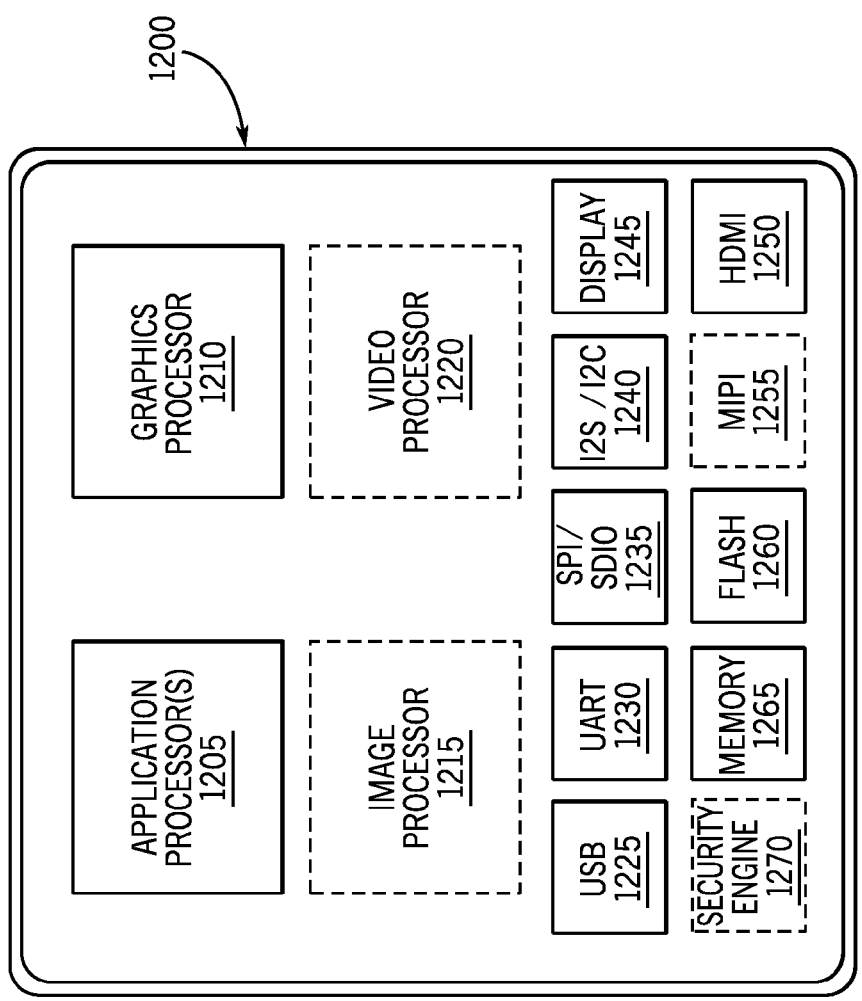
FIG. 24 is a block diagram showing an exemplary system on chip integrated circuit according to some embodiments.

FIG. 24 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

The following clauses and/or examples pertain to further embodiments:

One example embodiment may be a method comprising partitioning a storage as free-lists, said storage to store states for multi-rate shading, and multi-rate shading in a hardware using said storage. The method may also include using hierarchical indirection. The method may also include using a first buffer to store information about samples that pass an early depth test. The method may also include using a second buffer to store entries for coarse pixels. The method may also include using a third buffer to store information about how to reference said first and second buffers. The method may also include using pointers from one of said buffers to another of said buffers to reduce the need to store information in more than one buffer. The method may also include storing bits in said first buffer to indicate whether a sample stored in said first buffer is unlit, failed a stencil test, or failed a depth test. The method may also include storing centroids in said first buffer. The method may also include storing different data in said first buffer depending on the type of multi-sample anti-aliasing. The method may also include storing a pointer to said first buffer in said second buffer.

In another example embodiment may be one or more non-transitory computer readable media storing instructions executed by a processor to perform a sequence comprising partitioning a storage as free-lists, said storage to store states for multi-rate shading, and multi-rate shading in a hardware using said storage. The media may include said sequence including using hierarchical indirection. The media may include said sequence including using a first buffer to store information about samples that pass an early depth test. The media may include said sequence including using a second buffer to store entries for coarse pixels. The media may include said sequence including using a third buffer to store information about how to reference said first and second buffers. The media may include said sequence including using pointers from one of said buffers to another of said buffers to reduce the need to store information in more than one buffer. The media may include said sequence including storing bits in said first buffer to indicate whether a sample stored in said first buffer is unlit, failed a stencil test, or failed a depth test. The media may include said sequence including storing centroids in said first buffer. The media may include said sequence including storing different data in said first buffer depending on the type of multi-sample anti-aliasing. The media may include said sequence including storing a pointer to said first buffer in said second buffer.

In another example embodiment an apparatus comprising a storage, and a hardware processor to partition the storage as free-lists, said storage to store states for multi-rate shading and multi-rate shader to use said storage. The apparatus may include said processor to use hierarchical indirection. The apparatus may include said processor to use a first buffer to store information about samples that pass an early depth test. The apparatus may include said processor to use a second buffer to store entries for coarse pixels. The apparatus may include said processor to use a third buffer to store information about how to reference said first and second buffers. The apparatus may include said processor to use pointers from one of said buffers to another of said buffers to reduce the need to store information in more than one buffer. The apparatus may include said processor to store bits in said first buffer to indicate whether a sample stored in said first buffer is unlit, failed a stencil test, or failed a depth test. The apparatus may include said processor to store centroids in said first buffer. The apparatus may include said processor to store different data in said first buffer depending on the type of multi-sample anti-aliasing. The apparatus may include said processor to store a pointer to said first buffer in said second buffer.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   providing a storage with three buffers for multi-rate shading to avoid duplication between pixel rate and coarse pixel rate shading, including a first buffer for pixel rate shading, a second buffer for coarse pixel rate shading and a third buffer for pixel dispatch to reference said first and second buffers so that pixel rate or coarse pixel rate dispatch can use the first and second buffers or only the first buffer; and
   multi-rate shading in a hardware using said storage.

2. The method of claim 1 including storing bits in said first buffer to indicate whether a sample stored in said first buffer is unlit, failed a stencil test, or failed a depth test.

3. The method of claim 1 including storing centroids in said first buffer.

4. The method of claim 1 including storing different data in said first buffer depending on the type of multi-sample anti-aliasing.

5. The method of claim 1 including storing a pointer to said first buffer in said second buffer.

6. One or more non-transitory computer readable media storing instructions executed by a processor to perform a sequence comprising:
   providing a storage with three buffers for multi-rate shading to avoid duplication between pixel rate and coarse pixel rate shading, including a first buffer for pixel rate shading, a second buffer for coarse pixel rate shading and a third buffer for pixel dispatch to reference said first and second buffers so that pixel rate or coarse pixel rate dispatch can use the first and second buffers or only the first buffer; and
   multi-rate shading using said storage.

7. The media of claim 6 said sequence including storing bits in said first buffer to indicate whether a sample stored in said first buffer is unlit, failed a stencil test, or failed a depth test.

8. The media of claim 6 said sequence including storing centroids in said first buffer.

9. The media of claim 6 said sequence including storing different data in said first buffer depending on the type of multi-sample anti-aliasing.

10. The media of claim 6 said sequence including storing a pointer to said first buffer in said second buffer.

11. An apparatus comprising:
    a storage; and
    a hardware processor to provide a storage with three buffers for multi-rate shading to avoid duplication between pixel rate and coarse pixel rate shading, including a first buffer for pixel rate shading, a second buffer for coarse pixel rate shading and a third buffer for pixel dispatch to reference said first and second buffers so that pixel rate or coarse pixel rate dispatch can use the first and second buffers or only the first buffer, said storage to store states for multi-rate shading and multi-rate shader to use said storage.

12. The apparatus of claim 11 said processor to store bits in said first buffer to indicate whether a sample stored in said first buffer is unlit, failed a stencil test, or failed a depth test.

13. The apparatus of claim 11 said processor to store centroids in said first buffer.

14. The apparatus of claim 11 said processor to store different data in said first buffer depending on the type of multi-sample anti-aliasing.

15. The apparatus of claim 11 said processor to store a pointer to said first buffer in said second buffer.

* * * * *